United States Patent [19]
Hillyer et al.

[11] Patent Number: 5,845,316
[45] Date of Patent: Dec. 1, 1998

[54] SCHEDULING RANDOM I/O FOR DATA STORAGE TAPE

[75] Inventors: Bruce Kenneth Hillyer, Lebanon; Abraham Silberschatz, Summit, both of N.J.

[73] Assignee: Lucent Technologies Inc., Murray Hill, N.J.

[21] Appl. No.: 652,880

[22] Filed: May 23, 1996

[51] Int. Cl.[6] ...................................................... G06F 13/18
[52] U.S. Cl. ........................... 711/111; 711/158; 395/826; 395/861; 395/863; 395/732
[58] Field of Search ..................... 395/826, 861, 395/863; 711/111, 438, 485, 732, 439

[56] References Cited

U.S. PATENT DOCUMENTS

| | | | |
|---|---|---|---|
| 3,623,006 | 11/1971 | Balakian et al. | 711/111 |
| 4,888,691 | 12/1989 | George et al. | 711/111 |
| 5,644,786 | 7/1997 | Gallagher et al. | 395/826 |

OTHER PUBLICATIONS

"Understanding Computers: Memory and Storage", Time Life Books, Alexandria, Virginia, 1987:pp. 46–47.

*Primary Examiner*—Eddie P. Chan
*Assistant Examiner*—Reginald G. Bragdon

[57] ABSTRACT

A system for scheduling read-requests for a serpentine data tape. The transit time between arbitrarily selected locations in the tape is not a linear function of distance between the locations. Despite this non-linearity, a model has been developed which accurately predicts such transit times. Using the model, a list of read-requests is re-organized into a sequence requiring a minimal, or at least smaller, total time to execute.

10 Claims, 19 Drawing Sheets

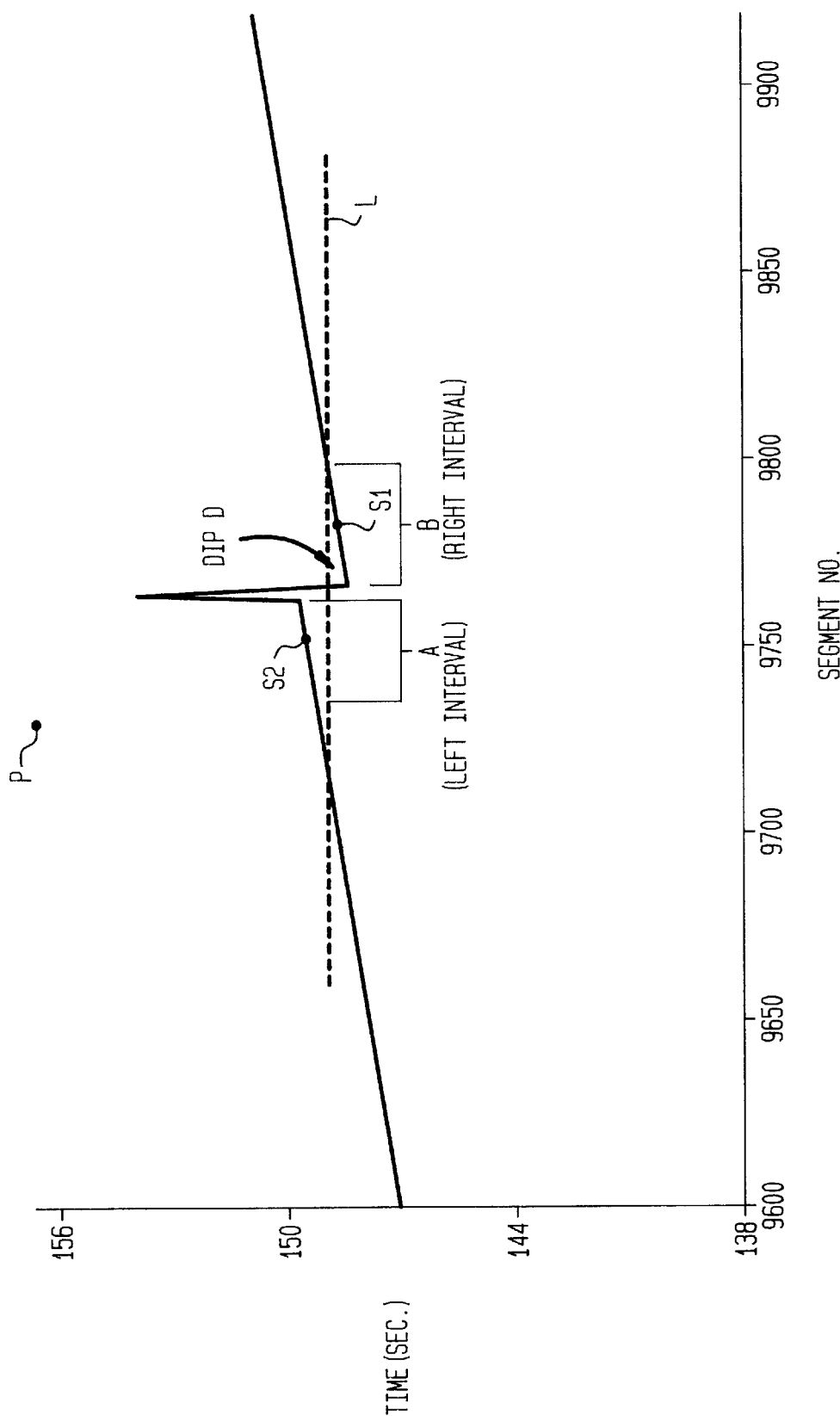

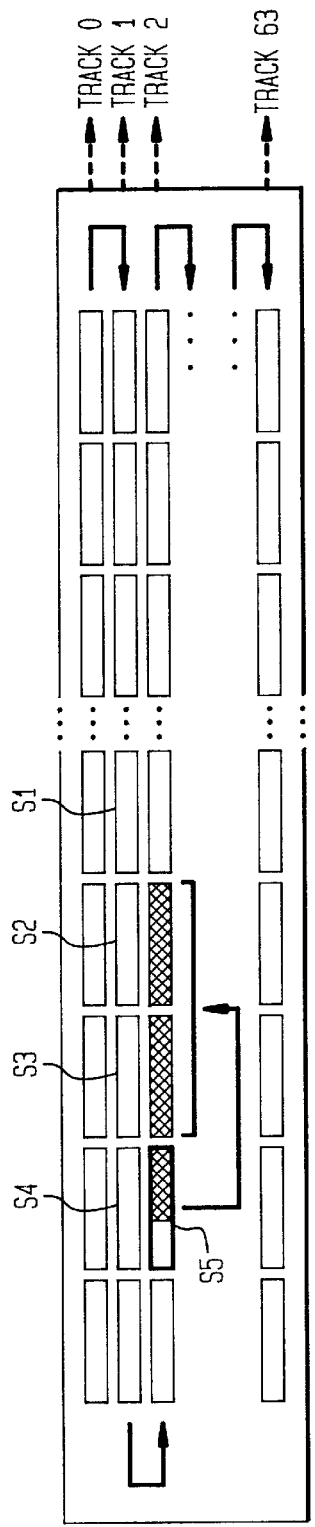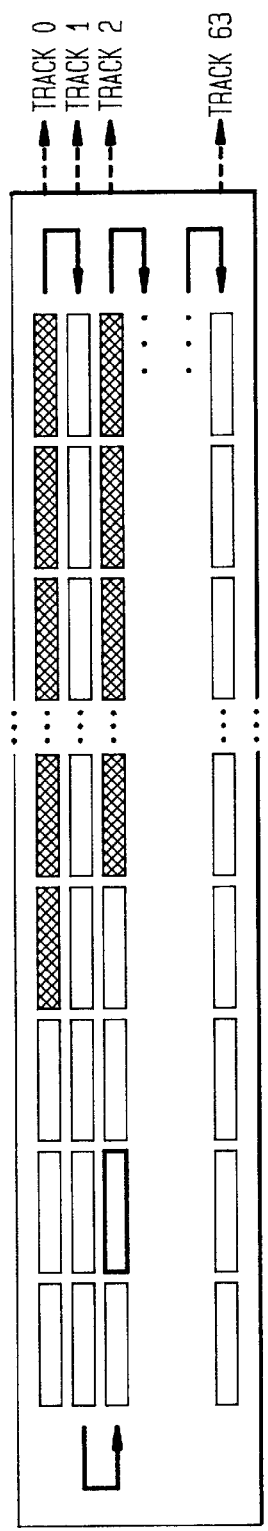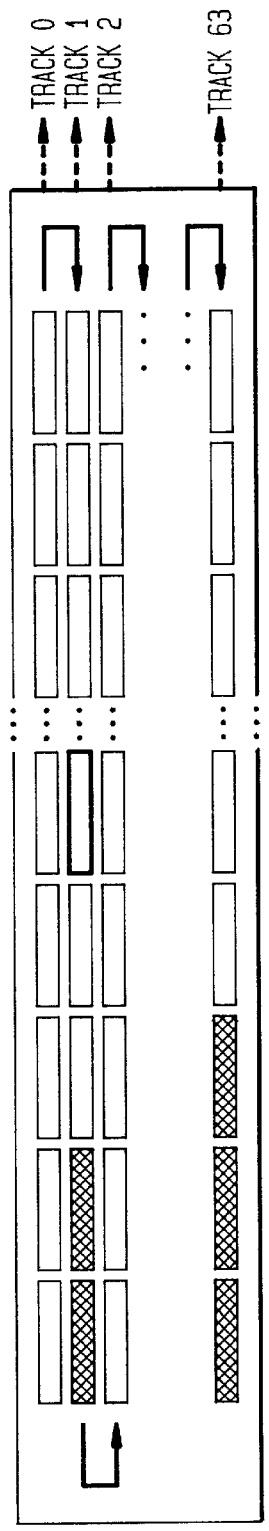
FIG. 5A  FIG. 5B  FIG. 5BB

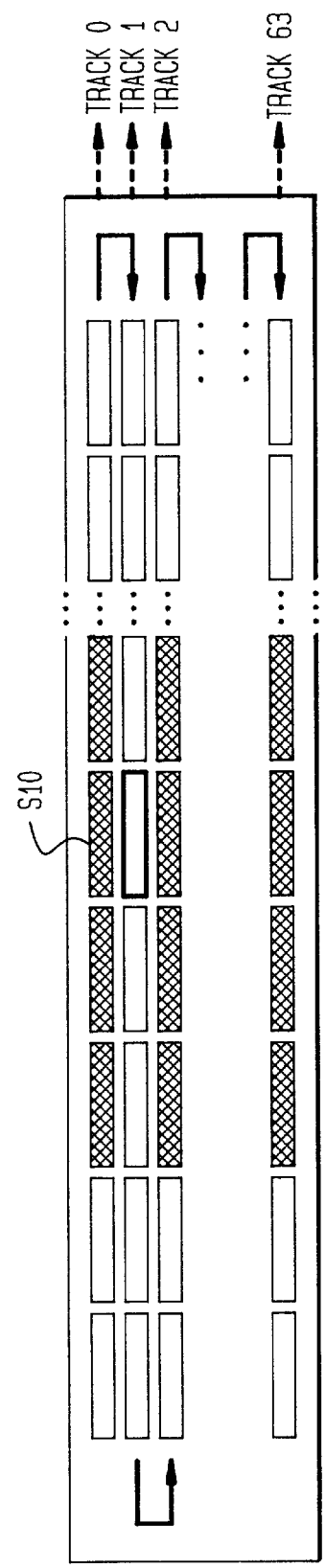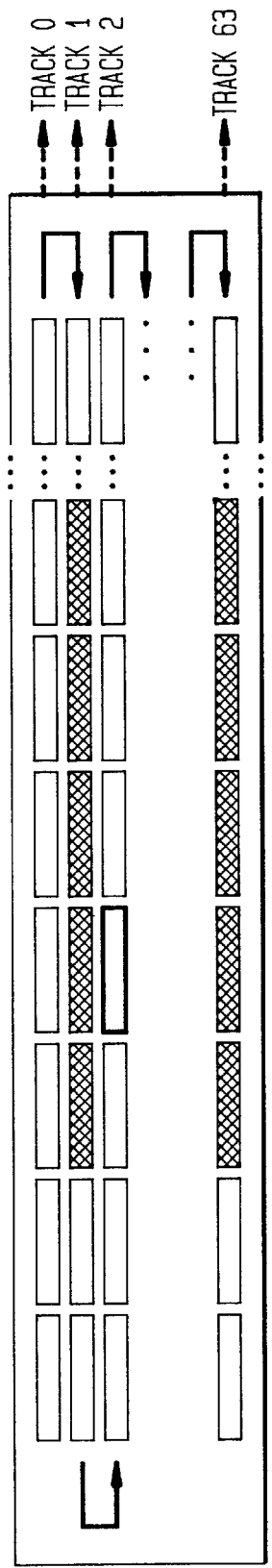

FIG. 11A

| NUM.LOCATES | ALGORITHM | NUM.TRIALS | TOT SEC. | STD.DEV. | PER LOCATE SEC. | STD.DEV. |
|---|---|---|---|---|---|---|
| 1 | OPT | 100000 | 72.403 | 33.751 | 72.403 | 33.751 |
| 1 | LOSS | 100000 | 72.403 | 33.751 | 72.403 | 33.751 |
| 1 | FIFO | 100000 | 72.403 | 33.751 | 72.403 | 33.751 |
| 1 | SORT | 100000 | 72.403 | 33.751 | 72.403 | 33.751 |
| 1 | SLTF | 100000 | 72.403 | 33.751 | 72.403 | 33.751 |
| 1 | SCAN | 100000 | 72.403 | 33.751 | 72.403 | 33.751 |
| 1 | WEAVE | 100000 | 72.403 | 33.751 | 72.403 | 33.751 |
| 2 | OPT | 100000 | 126.855 | 38.447 | 63.427 | 19.223 |
| 2 | LOSS | 100000 | 127.077 | 38.275 | 63.539 | 19.137 |
| 2 | FIFO | 100000 | 144.931 | 49.535 | 72.466 | 24.767 |
| 2 | SORT | 100000 | 144.675 | 49.801 | 72.337 | 24.900 |
| 2 | SLTF | 100000 | 128.457 | 38.490 | 64.229 | 19.245 |
| 2 | SCAN | 100000 | 139.214 | 50.263 | 69.607 | 25.132 |
| 2 | WEAVE | 100000 | 128.560 | 38.495 | 64.280 | 19.248 |
| 3 | OPT | 100000 | 169.596 | 38.258 | 56.532 | 12.753 |
| 3 | LOSS | 100000 | 174.187 | 41.483 | 58.062 | 13.828 |
| 3 | FIFO | 100000 | 217.482 | 61.604 | 72.494 | 20.535 |
| 3 | SORT | 100000 | 216.777 | 61.896 | 72.259 | 20.632 |
| 3 | SLTF | 100000 | 176.575 | 41.188 | 58.858 | 13.729 |
| 3 | SCAN | 100000 | 195.700 | 57.859 | 65.233 | 19.286 |
| 3 | WEAVE | 100000 | 176.964 | 41.275 | 58.988 | 13.758 |
| 4 | OPT | 100000 | 206.500 | 37.203 | 51.625 | 9.301 |
| 4 | LOSS | 100000 | 216.677 | 43.352 | 54.169 | 10.838 |
| 4 | FIFO | 100000 | 290.236 | 71.404 | 72.559 | 17.851 |
| 4 | SORT | 100000 | 288.720 | 71.844 | 72.180 | 17.961 |
| 4 | SLTF | 100000 | 220.328 | 43.315 | 55.082 | 10.829 |
| 4 | SCAN | 100000 | 244.261 | 61.162 | 61.065 | 15.290 |
| 4 | WEAVE | 100000 | 221.167 | 43.475 | 55.292 | 10.869 |
| 5 | OPT | 100000 | 240.039 | 36.279 | 48.008 | 7.256 |
| 5 | LOSS | 100000 | 255.081 | 44.271 | 51.016 | 8.854 |
| 5 | FIFO | 100000 | 362.597 | 79.944 | 72.519 | 15.989 |
| 5 | SORT | 100000 | 360.148 | 80.674 | 72.030 | 16.135 |
| 5 | SLTF | 100000 | 261.274 | 45.132 | 52.255 | 9.026 |
| 5 | SCAN | 100000 | 287.619 | 63.859 | 57.524 | 12.772 |
| 5 | WEAVE | 100000 | 262.566 | 45.400 | 52.513 | 9.080 |

FIG. 11B

| NUM.LOCATES | ALGORITHM | NUM.TRIALS | TOT SEC. | STD.DEV. | PER LOCATE SEC. | STD.DEV. |
|---|---|---|---|---|---|---|
| 6 | OPT | 100000 | 271.756 | 35.807 | 45.293 | 5.968 |
| 6 | LOSS | 100000 | 291.279 | 44.583 | 48.547 | 7.431 |
| 6 | FIFO | 100000 | 435.378 | 88.017 | 72.563 | 14.670 |
| 6 | SORT | 100000 | 431.914 | 88.622 | 71.986 | 14.770 |
| 6 | SLTF | 100000 | 300.533 | 46.747 | 50.089 | 7.791 |
| 6 | SCAN | 100000 | 328.212 | 66.883 | 54.702 | 11.147 |
| 6 | WEAVE | 100000 | 302.231 | 47.134 | 50.372 | 7.856 |
| 7 | OPT | 100000 | 301.794 | 35.298 | 43.113 | 5.043 |
| 7 | LOSS | 100000 | 325.127 | 44.491 | 46.447 | 6.356 |
| 7 | FIFO | 100000 | 507.654 | 94.999 | 72.522 | 13.571 |
| 7 | SORT | 100000 | 502.528 | 96.039 | 71.790 | 13.720 |
| 7 | SLTF | 100000 | 338.089 | 48.153 | 48.298 | 6.879 |
| 7 | SCAN | 100000 | 366.958 | 69.850 | 52.423 | 9.979 |
| 7 | WEAVE | 100000 | 340.259 | 48.413 | 48.608 | 6.916 |
| 8 | OPT | 100000 | 331.463 | 35.289 | 41.433 | 4.411 |
| 8 | LOSS | 100000 | 357.961 | 44.629 | 44.745 | 5.579 |
| 8 | FIFO | 100000 | 580.454 | 101.823 | 72.557 | 12.728 |
| 8 | SORT | 100000 | 574.100 | 103.240 | 71.763 | 12.905 |
| 8 | SLTF | 100000 | 374.885 | 49.449 | 46.861 | 6.181 |
| 8 | SCAN | 100000 | 405.597 | 73.740 | 50.700 | 9.217 |
| 8 | WEAVE | 100000 | 377.747 | 49.618 | 47.218 | 6.202 |
| 9 | OPT | 100000 | 360.373 | 35.186 | 40.041 | 3.910 |
| 9 | LOSS | 100000 | 389.789 | 44.841 | 43.310 | 4.982 |
| 9 | FIFO | 100000 | 653.116 | 108.175 | 72.568 | 12.019 |
| 9 | SORT | 100000 | 644.743 | 109.302 | 71.638 | 12.145 |
| 9 | SLTF | 100000 | 410.683 | 50.365 | 45.631 | 5.596 |
| 9 | SCAN | 100000 | 443.253 | 77.017 | 49.250 | 8.557 |
| 9 | WEAVE | 100000 | 414.249 | 50.513 | 46.028 | 5.613 |
| 10 | OPT | 10000 | 389.006 | 35.538 | 38.901 | 3.554 |
| 10 | LOSS | 100000 | 421.052 | 45.422 | 42.105 | 4.542 |
| 10 | FIFO | 100000 | 725.732 | 113.992 | 72.573 | 11.399 |
| 10 | SORT | 100000 | 715.089 | 115.658 | 71.509 | 11.566 |
| 10 | SLTF | 100000 | 445.947 | 51.731 | 44.595 | 5.173 |
| 10 | SCAN | 100000 | 480.591 | 79.817 | 48.059 | 7.982 |
| 10 | WEAVE | 100000 | 449.858 | 51.801 | 44.986 | 5.180 |
| 12 | OPT | 100 | 446.207 | 40.173 | 37.184 | 3.348 |
| 12 | LOSS | 100000 | 482.687 | 47.040 | 40.224 | 3.920 |
| 12 | FIFO | 100000 | 870.370 | 125.039 | 72.531 | 10.420 |
| 12 | SORT | 100000 | 854.882 | 127.314 | 71.240 | 10.609 |
| 12 | SLTF | 100000 | 514.764 | 53.909 | 42.897 | 4.492 |
| 12 | SCAN | 100000 | 554.597 | 85.017 | 46.216 | 7.085 |
| 12 | WEAVE | 100000 | 520.088 | 53.727 | 43.341 | 4.477 |
| 16 | LOSS | 100000 | 603.720 | 51.400 | 37.732 | 3.212 |
| 16 | FIFO | 100000 | 1160.563 | 144.330 | 72.535 | 9.021 |
| 16 | SORT | 100000 | 1132.131 | 148.184 | 70.758 | 9.262 |
| 16 | SLTF | 100000 | 647.872 | 57.749 | 40.492 | 3.609 |
| 16 | SCAN | 100000 | 698.639 | 91.221 | 43.665 | 5.701 |
| 16 | WEAVE | 100000 | 656.680 | 57.079 | 41.043 | 3.567 |

FIG. 11C

| NUM.LOCATES | ALGORITHM | NUM.TRIALS | TOT SEC. | STD.DEV. | PER LOCATE SEC. | STD.DEV. |
|---|---|---|---|---|---|---|
| 24 | LOSS | 100000 | 840.988 | 59.886 | 35.041 | 2.495 |
| 24 | FIFO | 100000 | 1740.596 | 176.807 | 72.525 | 7.367 |
| 24 | SORT | 100000 | 1673.561 | 182.992 | 69.732 | 7.625 |
| 24 | SLTF | 100000 | 904.547 | 65.262 | 37.689 | 2.719 |
| 24 | SCAN | 100000 | 972.635 | 102.099 | 40.526 | 4.254 |
| 24 | WEAVE | 100000 | 921.174 | 63.115 | 38.382 | 2.630 |
| 32 | LOSS | 100000 | 1073.516 | 67.579 | 33.547 | 2.112 |
| 32 | FIFO | 100000 | 2321.616 | 204.472 | 72.551 | 6.390 |
| 32 | SORT | 100000 | 2198.090 | 212.718 | 68.690 | 6.647 |
| 32 | SLTF | 100000 | 1152.605 | 72.461 | 36.019 | 2.264 |
| 32 | SCAN | 100000 | 1239.514 | 112.043 | 38.735 | 3.501 |
| 32 | WEAVE | 100000 | 1178.511 | 68.807 | 36.828 | 2.150 |
| 48 | LOSS | 100000 | 1525.404 | 80.890 | 31.779 | 1.685 |
| 48 | FIFO | 100000 | 3481.616 | 250.292 | 72.534 | 5.214 |
| 48 | SORT | 100000 | 3184.133 | 260.414 | 66.336 | 5.425 |
| 48 | SLTF | 100000 | 1629.645 | 84.969 | 33.951 | 1.770 |
| 48 | SCAN | 100000 | 1755.657 | 129.629 | 36.576 | 2.701 |
| 48 | WEAVE | 100000 | 1676.233 | 78.859 | 34.922 | 1.643 |
| 64 | LOSS | 100000 | 1961.235 | 92.416 | 30.644 | 1.444 |
| 64 | FIFO | 100000 | 4642.188 | 290.186 | 72.534 | 4.534 |
| 64 | SORT | 100000 | 4084.760 | 295.401 | 63.824 | 4.616 |
| 64 | SLTF | 100000 | 2088.142 | 95.783 | 32.627 | 1.497 |
| 64 | SCAN | 100000 | 2256.544 | 144.980 | 35.258 | 2.265 |
| 64 | WEAVE | 100000 | 2157.303 | 89.029 | 33.708 | 1.391 |
| 96 | LOSS | 100000 | 2789.439 | 112.928 | 29.025 | 1.176 |
| 96 | FIFO | 100000 | 6962.379 | 354.550 | 72.525 | 3.693 |
| 96 | SORT | 100000 | 5625.792 | 332.545 | 58.602 | 3.464 |
| 96 | SLTF | 100000 | 2959.545 | 115.173 | 30.829 | 1.200 |
| 96 | SCAN | 100000 | 3217.262 | 169.847 | 33.513 | 1.769 |
| 96 | WEAVE | 100000 | 3074.811 | 108.607 | 32.029 | 1.131 |
| 128 | READ | - | 14037.000 | - | 109.664 | - |
| 128 | LOSS | 100000 | 3555.006 | 131.037 | 27.773 | 1.024 |
| 128 | FIFO | 100000 | 9283.646 | 409.944 | 72.528 | 3.203 |
| 128 | SORT | 100000 | 6846.096 | 337.469 | 53.485 | 2.636 |
| 128 | SLTF | 100000 | 3779.876 | 132.685 | 29.530 | 1.037 |
| 128 | SCAN | 100000 | 4134.276 | 191.967 | 32.299 | 1.500 |
| 128 | WEAVE | 100000 | 3941.167 | 127.383 | 30.790 | 0.995 |
| 192 | READ | - | 14037.000 | - | 73.109 | - |
| 192 | LOSS | 100000 | 4938.601 | 158.627 | 25.722 | 0.826 |
| 192 | FIFO | 100000 | 13926.659 | 502.179 | 72.535 | 2.616 |
| 192 | SORT | 100000 | 8575.544 | 304.530 | 44.664 | 1.586 |
| 192 | SLTF | 100000 | 5285.638 | 161.744 | 27.529 | 0.842 |
| 192 | SCAN | 100000 | 5853.557 | 229.157 | 30.487 | 1.194 |
| 192 | WEAVE | 100000 | 5532.907 | 161.196 | 28.817 | 0.840 |

FIG. 11D

| NUM.LOCATES | ALGORITHM | NUM.TRIALS | TOT SEC. | STD.DEV. | PER LOCATE SEC. | STD.DEV. |
|---|---|---|---|---|---|---|
| 256 | READ | - | 14037.000 | - | 54.832 | - |
| 256 | LOSS | 25000 | 6145.605 | 178.246 | 24.006 | 0.696 |
| 256 | FIFO | 25000 | 18567.832 | 581.187 | 72.531 | 2.270 |
| 256 | SORT | 25000 | 9715.891 | 261.267 | 37.953 | 1.021 |
| 256 | SLTF | 25000 | 6629.182 | 185.812 | 25.895 | 0.726 |
| 256 | SCAN | 25000 | 7441.028 | 259.486 | 29.067 | 1.014 |
| 256 | WEAVE | 25000 | 6956.380 | 189.556 | 27.173 | 0.740 |
| 384 | READ | - | 14037.000 | - | 36.555 | - |
| 384 | LOSS | 12000 | 8128.107 | 202.479 | 21.167 | 0.527 |
| 384 | FIFO | 12000 | 27853.414 | 713.020 | 72.535 | 1.857 |
| 384 | SORT | 12000 | 11168.294 | 200.543 | 29.084 | 0.522 |
| 384 | SLTF | 12000 | 8898.256 | 218.728 | 23.173 | 0.570 |
| 384 | SCAN | 12000 | 10277.128 | 303.381 | 29.763 | 0.790 |
| 384 | WEAVE | 12000 | 9362.236 | 235.396 | 24.381 | 0.613 |
| 512 | READ | - | 14037.000 | - | 27.416 | - |
| 512 | LOSS | 7000 | 9642.639 | 210.120 | 18.833 | 0.410 |
| 512 | FIFO | 7000 | 37144.315 | 819.344 | 72.547 | 1.600 |
| 512 | SORT | 7000 | 12088.948 | 168.440 | 23.611 | 0.329 |
| 512 | SLTF | 7000 | 10684.087 | 236.165 | 20.867 | 0.461 |
| 512 | SCAN | 7000 | 12712.279 | 343.061 | 24.829 | 0.670 |
| 512 | WEAVE | 7000 | 11257.297 | 268.032 | 21.987 | 0.524 |
| 768 | READ | - | 14037.000 | - | 18.277 | - |
| 768 | LOSS | 3000 | 11708.720 | 199.816 | 15.246 | 0.260 |
| 768 | FIFO | 3000 | 55701.086 | 1015.727 | 72.527 | 1.323 |
| 768 | SORT | 3000 | 13204.078 | 134.291 | 17.193 | 0.175 |
| 768 | SLTF | 3000 | 13147.719 | 242.536 | 17.119 | 0.316 |
| 768 | SCAN | 3000 | 16620.846 | 380.291 | 21.642 | 0.495 |
| 768 | WEAVE | 3000 | 13895.531 | 319.832 | 18.093 | 0.416 |
| 1024 | READ | - | 14037.000 | - | 13.708 | - |
| 1024 | LOSS | 1600 | 12935.076 | 176.348 | 12.632 | 0.172 |
| 1024 | FIFO | 1600 | 74275.138 | 1165.614 | 72.534 | 1.138 |
| 1024 | SORT | 1600 | 13821.580 | 113.879 | 13.498 | 0.111 |
| 1024 | SLTF | 1600 | 14531.100 | 226.080 | 14.191 | 0.221 |
| 1024 | SCAN | 1600 | 19502.522 | 431.935 | 19.045 | 0.422 |
| 1024 | WEAVE | 1600 | 15507.694 | 409.619 | 15.144 | 0.400 |
| 1536 | READ | - | 14037.000 | - | 9.139 | - |
| 1536 | LOSS | 800 | 14115.234 | 129.117 | 9.190 | 0.084 |
| 1536 | FIFO | 800 | 111412.953 | 1389.721 | 72.534 | 0.905 |
| 1536 | SORT | 800 | 14398.023 | 81.801 | 9.374 | 0.053 |
| 1536 | SLTF | 800 | 15493.742 | 191.687 | 10.087 | 0.125 |
| 1536 | SCAN | 800 | 23016.438 | 548.239 | 14.985 | 0.357 |
| 1536 | WEAVE | 800 | 17144.417 | 635.357 | 11.162 | 0.414 |
| 2048 | READ | - | 14037.000 | - | 6.854 | - |
| 2048 | LOSS | 400 | 14548.879 | 96.080 | 7.104 | 0.047 |
| 2048 | FIFO | 400 | 148576.059 | 1579.507 | 72.547 | 0.771 |
| 2048 | SORT | 400 | 14613.521 | 65.799 | 7.136 | 0.032 |
| 2048 | SLTF | 400 | 15456.926 | 171.422 | 7.547 | 0.084 |
| 2048 | SCAN | 400 | 24420.779 | 726.271 | 11.924 | 0.355 |
| 2048 | WEAVE | 400 | 17761.185 | 718.332 | 8.672 | 0.351 | ant
SCHEDULING RANDOM I/O FOR DATA STORAGE TAPE

The invention re-arranges a list of data blocks into a specific order, to reduce the time required to read the data blocks from a data tape.

BACKGROUND OF THE INVENTION

Commercially available tape drives, used for data storage in computer systems, possess enormous storage capacity: one type can store about 20 Giga-Bytes (GB) of data. One byte corresponds to eight bits, and one GB corresponds to one billion bytes.

However, many manufacturers of tape drives do not publicly disclose technical information concerning the control system which operates the tape drive. Instead, the manufacturers provide an interface with which a user communicates using a high-level command language. As a generalized example, one command would be "locate(x)", wherein the user specifies a data segment "x" and, in response, the control system locates the read/write head over segment "x" on the tape, for reading the data contained within segment "x".

One disadvantage of the high-level interface is that the length of time required to locate a segment "x" is not known. However, it is reasonable to assume that different segments, at different locations, will require different amounts of time to be located. Consequently, it is clear that the total time for locating several segments will depend on the order in which they are located, and that some orderings will require less time than others.

The high level command set, in general, does not contain commands which directly attain an optimal ordering.

SUMMARY OF THE INVENTION

In one form of the invention, a list of read requests for a serpentine data tape is rearranged into a different order, which requires less total time to execute. The rearranged order is attained through computation of travel times between pairs of read requests, and selection of an order having a reduced total of travel times.

BRIEF DESCRIPTION OF THE DRAWINGS

FIG. 4 is an enlargement of the region surrounding point PA in FIG. 2.

FIGS. 11A–11D is a table of data illustrating results of simulations of the invention.

DETAILED DESCRIPTION OF THE INVENTION

General Overview

The data in a serpentine tape is divided into tracks, which have been found to be divided into sections, which are themselves divided into segments. The invention undertakes the following steps in scheduling accesses to the tape.

1. A plot is derived, such as that shown in FIG. 2, which indicates the logical addresses of sections of data on the tape. This plot indicates the length of time required to reach each segment contained within the sections. Each time is measured from the beginning of the tape.
2. Using this plot, together with measured timing data obtained from the tape, a mathematical model is derived.

Figure 2:
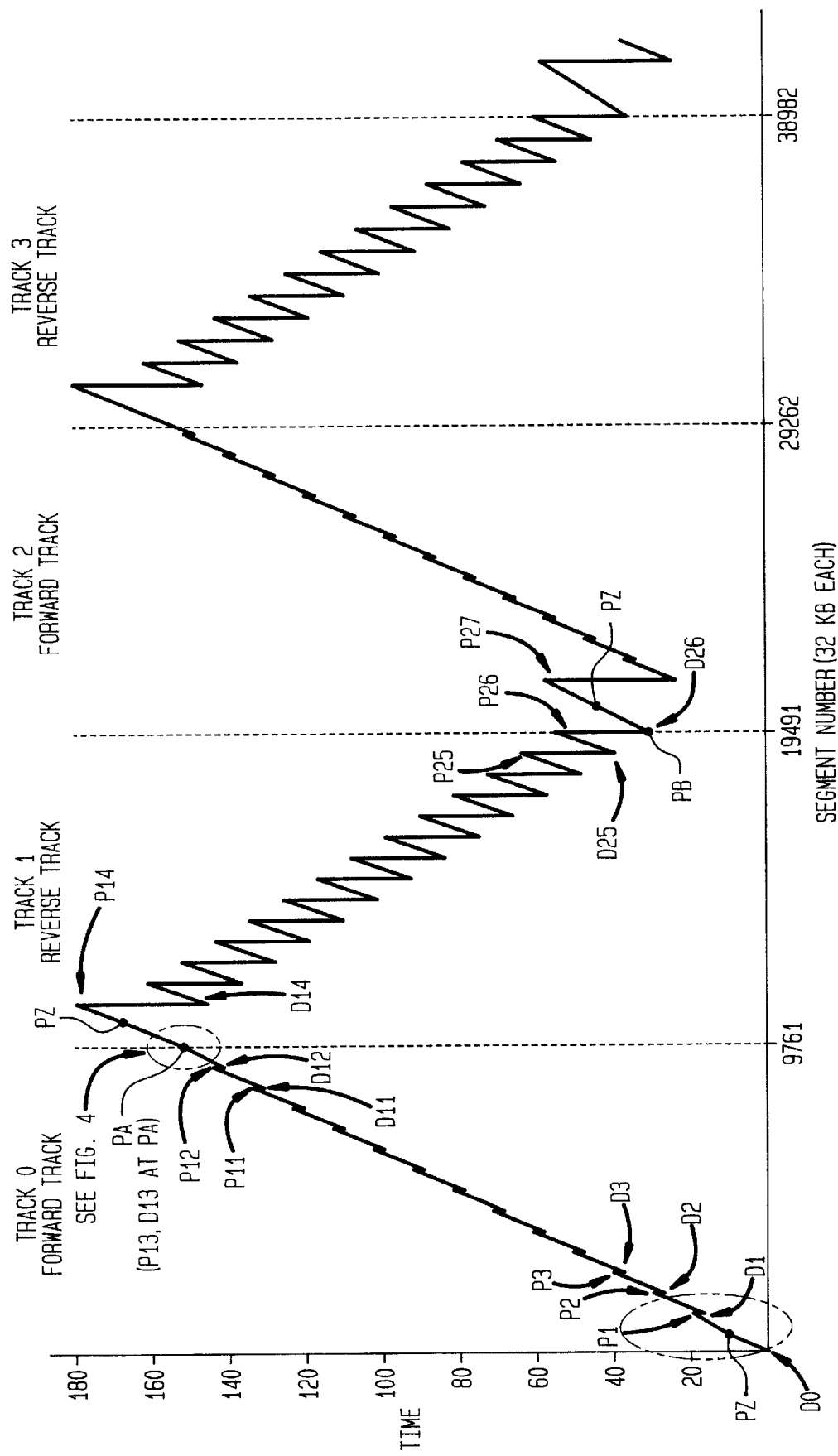
FIG. 2 is a plot of times required to locate different segments on a serpentine data tape, starting from the beginning of the tape.

The model allows computation of the time required to reach any segment, starting from any other segment (as opposed to starting from the beginning of the tape, as in FIG. 2).

3. A list of data segments to be read is obtained from a human operator, or other source.
4. Using the model of step 2, the invention arranges the data segments into a sequence. In general, reading the segments in the sequence takes less time than reading the segments in the order given in the list of step 3.

Detailed Discussion

Figure 1:
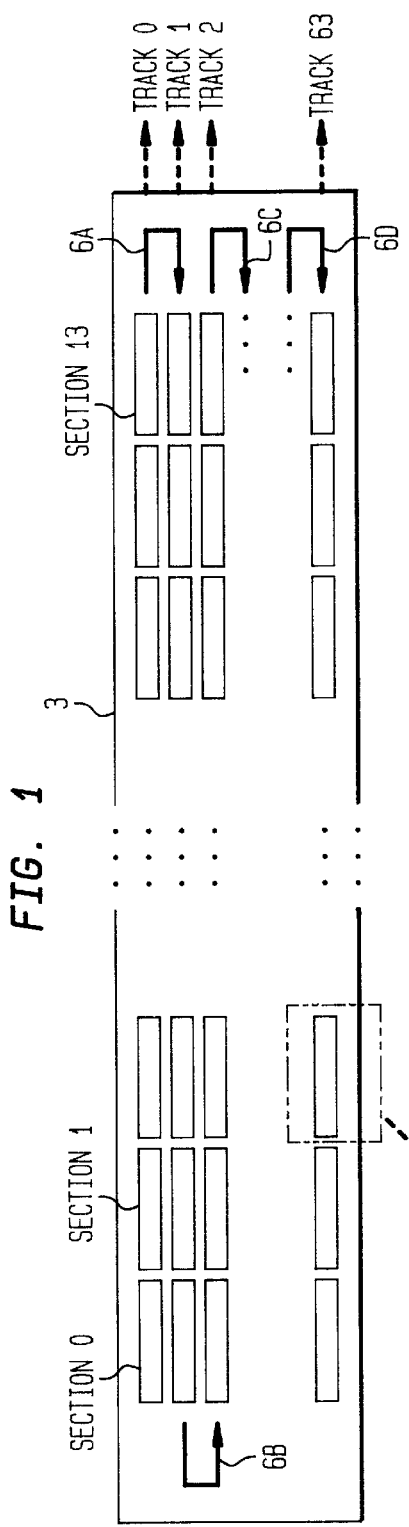
FIG. 1 illustrates arrangement of data into sections in a serpentine data tape. Each section contains about 704 segments of data, containing 32 Kilo-bytes of data each.

The arrangement of data on a serpentine tape will first be described. In FIG. 1, a tape 3 contains sections of data arranged in tracks, labeled TRACK 0, TRACK 1, and so on. The tape 3 contains 64 parallel tracks, 0 through 63, as indicated.

The term "serpentine" refers to the fact that the path of the read/write head (not shown), with respect to the tape, is serpentine in nature, as indicated by arrows 6A–6D. That is, for example, if the head reads both TRACKs 0 and 1 completely and sequentially, the head moves from left-to-right along TRACK 0, and then, at the end of TRACK 0, at the right side of the Figure, switches to TRACK 1, as indicated by arrow 6A, and then moves in the opposite direction, from right-to-left, in reading TRACK 1.

The sections are divided into segments. Each TRACK contains 14 sections. Each section contains approximately 704 segments. Each segment contains 32 Kilo-Bytes (KB). The entire tape contains about 625,000 segments: 20 GB total bytes per tape divided by 32 KB per segment corresponds to $20 \times 10^9 / 32 \times 10^3$, which equals 625,000 segments.

Plot of Logical Addresses

FIG. 2 illustrates information used by the invention. FIG. 2 is a plot of times required to reach various segments, when starting at the beginning of the tape. For example, point PA indicates the time (about 150 seconds) required to reach segment 9761, when starting at the beginning of the tape. Similarly, point PB indicates the time (about 27 seconds) required to reach segment 19,491, when starting at the beginning of the tape.

Figure 3:
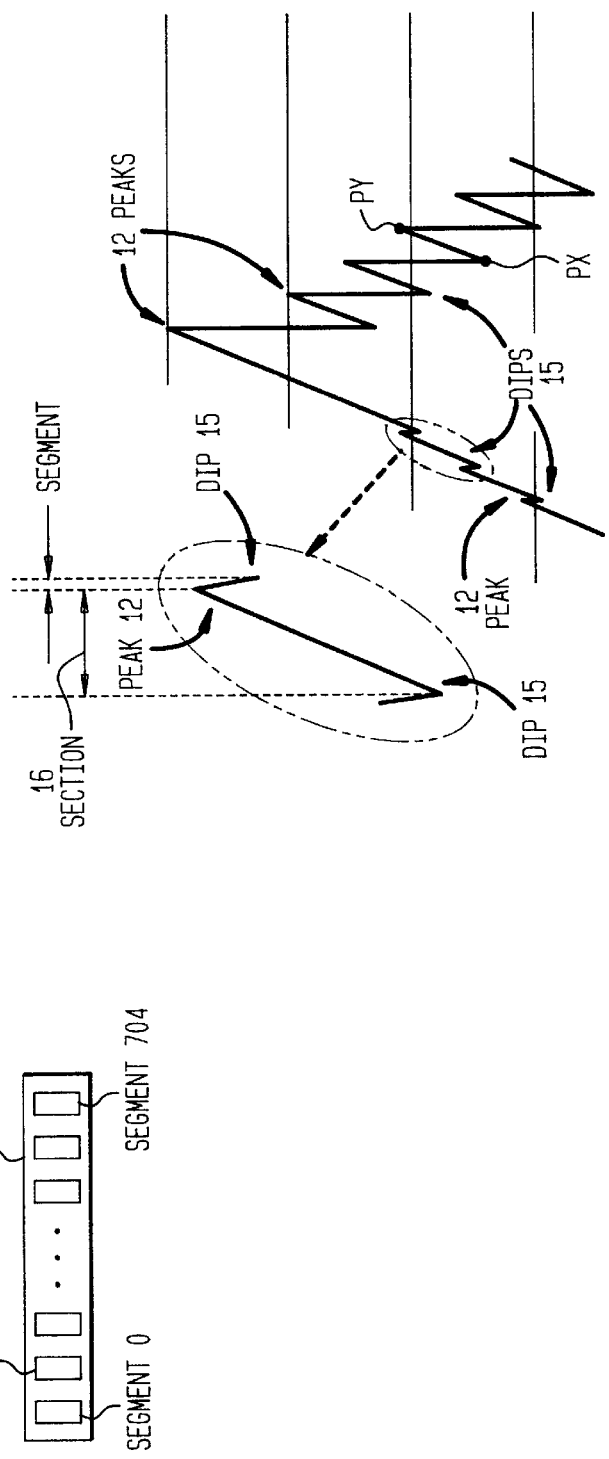
FIG. 3 is an enlargement of part of FIG. 2.

Two particular features of FIG. 2 are significant in the present context, and are indicated in FIG. 3. The features are the peaks 12 and dips 15, both of which will collectively be termed "key points" herein. It has been found that each section runs from a dip 15 to the succeeding peak 12, as indicated in the upper left side of the Figure. In addition, it has been found that a single segment runs from each peak to the succeeding dip, as also indicated at the upper left of the Figure. This latter segment is considered to be included within the section, not labeled, which follows the section shown, labeled 16.

To elaborate upon the dip-section-peak sequences: in FIG. 2, TRACK 0 is indicated at the left side, and contains 14 sections, beginning with two sections residing between dip D0 and peak P1, which are separated by a point PZ, whose location is indicated on the plot, but which is not actually detected by the methodology used to generate the plot. (That is, when locating points P1, P2, etc., by running from the beginning of the tape, point PZ does not appear. Other approaches are required to locate PZ, as by bisecting the region from D0 to P1. In fact, one definition of PZ relies on such bisection. Further, a point PZ exists in every track, midway between the start of the track and the first peak shown in FIG. 2. For example, a point PZ resides between D13 and P14, and also between D26 and P27.) The 14 sections end with the section residing between dip D12 and peak P13, consistent with FIG. 1.

Similarly, in FIG. 2, TRACK 1 contains 14 sections, beginning with the two sections (separated by a PZ) residing between dip D13 and peak P14, and ending with that residing between dip D25 and peak P26, again consistent with FIG. 1.

The dotted line in FIG. 2 represents rewind times required to reach the beginning of the tape, starting with the respective segments.

The invention obtains a plot of the type shown in FIG. 2 for each tape to be used. That is, every tape requires its own plot: the plots are not interchangeable between different tapes. A simplistic approach to obtaining the plot would be to (1) issue a "locate" request for the very first segment in a track,
(2) measure the time required to reach the segment,
(3) rewind the tape to its beginning,
(4) issue a "locate" request for the next segment,
(5) measure the time required to reach that segment, and so on.

However, this approach can consume a large amount of time: FIG. 2 indicates that the average time to rewind the tape to its beginning (required in step 3) is about 70 seconds. To rewind the tape for each of 625,000 segments will require over 12,000 hours.

Another approach is to locate the key points in FIG. 2, which bracket the sections, rather than to locate the segments within the sections. One justification for this approach is the observation that the time required to travel from the beginning of a section to a segment within the section is almost linearly proportional to the distance of the segment from the beginning of the section.

However, a problem arises in attempting to locate the key points: the key points, unlike individual segments, are not directly addressable using the high-level command language. Only segments are addressable.

For example, it was stated above that each section contains approximately 704 segments. This is an average number. It cannot be assumed that each section begins exactly at N×704, wherein N is an integer. Attempting to locate a section based on such an assumption can result in serious errors. For example, if all sections contained 704 segments, except one, which contained 705 segments, then applying the assumption will, for example, locate the end of a segment at point PX in FIG. 3, rather than at PY. The time-difference between the two points is about 25 seconds.

To locate the key points, the invention implements a "dip-bracketing algorithm." The operation of the algorithm will be explained with reference to FIG. 4, which represents empirical data obtained from a tape.

The dip is flanked by two regions, A and B. These regions do not overlap in time, as line L indicates. Region A, or "left interval," is higher (in time units) than region B, or "right interval."

Of course, the measured data will not necessarily produce the clean plot of FIG. 4. For example, point P may exist. Such points are termed "outliers," and are ignored by the algorithm, as step 4, below, indicates. An outlier can result, for example, from a glitch which prevents the controller from reading a segment. The controller may then rewind the tape and try again, causing the total time for locating the segment to be significantly larger than normal.

The algorithm performs the following steps:

1. Searches for a segment, such as S1, by issuing a command to locate a specific segment, such as 704, 2×704, 3×704, etc., depending upon the section being processed. The invention measures the time required to arrive at the segment. The measured time indicates whether the segment lies in the left- or right interval in FIG. 4. If an outlier is found, it is ignored and the search is repeated.

Exemplary times which define the left- and right intervals are given in Table 1, below.

2. Searches for a segment S2 having a locate time in the other interval, again, ignoring outliers. For example, if the search of step 1 found a point in the right interval, by issuing a locate command to locate segment 704, then, in step 2, a locate command for a lower-numbered segment is issued, such as 702 or 703. Again, the time required to reach the segment is measured.

3. Repeatedly taking the mean between S1 and S2, to locate dip D. Each mean provides a "new" S1 or S2. If the new mean lies in the left interval, then a new S2 is obtained; if the mean lies in the right interval, a new S1 is obtained. After finding the mean, a new mean is taken between either (a) the new S1 and the old S2, or (b) the new S2 and the old S1, as appropriate. The process is repeated until S1 and S2 coincide, whereupon D is found.

4. When an outlier is found, neighboring segments are located, successively farther away from the outlier, as in steps 1 or 2, until a non-outlier is found. Then the bisection continues as in step 3.

Using this alorithm, the dip D in FIG. 4 is located. The algorithm finds all dips D in FIG. 2. However, locating all dips can take a significant amount of time. For 896 key points on a tape (64 tracks×14 key points per track), a search is required for each key point (because, as stated above, key points cannot be addressed directly). The search runs up the tape, to a location in the vicinity of N×704 segments. If a minimum point is not found, the tape is rewound, and the search repeated, for a point such as N×704+1. Each search is termed a probe.

If the average probe time is assumed to require 3 minutes, and if 8 probes are required per point, then, for 896 points, 3×8×896 minutes, or about 330 hours, corresponding to two weeks, are required. (The number 896 was used for simplicity. In fact, one point less for each track is required, bringing the total points searched to 832, which is considered the same as 896, for estimation purposes.)

The locate times which define the left- and right intervals in FIG. 4 will, in general, depend on the particular tape and controller used, and must be measured empirically, by repeatedly issuing locate commands. However, once the left- and right intervals have been located for a given tape-and-controller combination, it has been found that these intervals apply with high accuracy to similar tapes run by the same controller.

The invention reduces the search time by probing from a previous point, rather than from the beginning of the tape. For point P1, the times are measured from dip D0. For point P2, the times are measured from PZ. For points P3–P13, the times are measured from the second previous point. That is, for point P4, the times are measured from point P2; for P5, the times are measured from P3, and so on.

In the Quantum DLT 4000 series tape and controller combination, available from Quantum Corporation, 715 Sycamore Ave., Milpitas, Calif., the left-and right intervals for track 0 are positioned as indicated in Table 1:

TABLE 1

(Track 0)

| Point (FIG. 2) | Left Interval (A) | Right Interval (B) |
|---|---|---|
| P1 | 31–34 sec. | 26–29 sec. |
| P2–P12 | 41–47 sec. | 36–38 sec. |
| P13 | 16–22 sec. | 11–14 sec. |

The invention further reduces the search time by eliminating many of the "probe" steps. Motivation for this elimination is based on the discovery of the following three characteristics of the tape:

1. The first dip following PZ in each track in FIG. 2 (eg, D1, D14, and D27) has been found to reside between segments number 1406 to 1412, inclusive, counted from the beginning of the track.
2. The eleven dips that follow the dip identified in step 1, for each track, each reside either 704 or 705 segments beyond the previous dip.
3. The length of the last segment on a track can vary by over 100 segments.

The invention uses these characteristics as follows.

1. To find the first dip following PZ in FIG. 2, the invention locates the read/write head at segment 1409, which is mid-way between 1406 and 1412. If segment 1409 is found to lie in the left interval of FIG. 4, then the tape is re-wound and segment 1411 is located, which is considered mid-way between 1409 and 1412. If segment 1411 lies in the right interval, which happens in many cases, then the dip will be found at segment 1410.

If segment 1409 is found to lie in the right interval, then the tape is re-wound and segment 1407 is located, which is considered mid-way between 1409 and 1406. If segment 1407 lies in the left interval, which happens in many cases, then the dip will be found at segment 1408.

The two pairs of probes just described occur most commonly. If these two probes do not succeed in locating the dip, a third probe, as in step 3 of the algorithm, will most likely locate the dip. These two, or three, probes are significantly fewer than the eight probes described above.

2. Point PZ is defined as residing mid-way between the point located in the previous step and the beginning of the track.

3. To find the next eleven dips, the invention first advances the read/write head from the second-previous dip (from the point to be found) to the 704th segment beyond the previous dip (again from the point to be found). For example, in step 1, P1 was found. To find P2, the head is advanced from PZ (the second-previous dip) to the 704th segment beyond P1 (the previous dip).

If the time required for this advancement lies in a predetermined interval, such as in the right interval A, defined in FIG. 4, the dip is taken as at the 704th segment. If not, the dip is taken as one segment earlier, at segment 703. This step eliminates 77 probes per track.

This process is repeated for the remaining dips, except the last one.

4. To find the end of a track, or last peak, a full bracketing search is undertaken, as described above in connection with FIG. 4. The invention probes at 587 segments beyond the last dip found in step 3, and then repeatedly searches higher or lower, in increments of 32 segments, depending on whether the locate time lies in the left or right interval, until the track end has been bracketed. The end of the track is usually bracketed after 2 probes, but sometimes 5 probes are required.

Analysis indicates that the procedure described above can locate the key points of one type of tape in about 20 hours. In another embodiment, searching for dips D2 through D12, and the corresponding dips in other tracks, can be omitted, reducing the time to about 12 hours. Estimated values of these points are later obtained by interpolation between points D1 and D13, and the corresponding dips in other tracks. However, this embodiment produces a small reduction in accuracy of the scheduling process.

Therefore, as an initial step, the invention obtains data from which a plot can be drawn of the type shown in FIG. 2 for each tape. This plot provides a logical address for the beginning and end of each section.

Model of Transit Times

In a simplistic approach, the times required to move between all possible pairs of segments in a tape can be actually measured and stored. These times will be called "transit times." However, for the types of tapes discussed herein, this approach can be impractical.

For example, as stated above, the tapes in question can contain about 625,000 segments. The number of possible pairs within this number of segments is about 625,000-squared, or about $4 \times 10^{11}$, corresponding to about 400 billion pairs.

If each pair requires 8 bytes of data to represent the corresponding transit time, the total amount of data becomes $32 \times 10^{11}$, or about 3,200 Giga-Bytes. This amount of data would require about 160 tapes, of the type in question, merely to store the data for the access times for all pairs of segments. In addition to the vast storage capacity required, the time required to measure these 400 billion transit times can be quite large.

The invention does not store transit times for all possible pairs. Instead, the invention stores mathematical functions, or a model, from which the transit times can be computed. The mathematical functions are derived from a small group of measured transit times, the small group being a subset of the total possible transit times. In a very simplified sense, the mathematical functions represent a "curve-fitting" to the small group of measured transit times.

The mathematical model can be subdivided into seven sub-models. When a transit time is needed for a particular pair, the appropriate sub-model is selected, and used to compute transit time. The sub-model is selected based on three main factors:

(1) Direction from the starting segment to the target segment.
(2) Distance from the starting segment to the target segment.
(3) Track relation between the segments (e.g., same track, co-directional tracks, anti-directional tracks).

The situations to which each of the seven sub-models are applicable are explained with reference to FIGS. 5A–5G.

FIGS. 5A–5G

The blocks in these Figures represent sections, which contain segments (not shown), as indicated in FIG. 1. The controller locates the read-write head at individual segments.

Situation 1. In FIG. 5A, the target segment lies within a section forward of the starting section, but within the same track, and either (a) within two sections of the section holding the starting segment or (b) within the same section as that holding the starting segment, but forward.

In the Figures, the starting section is indicated by heavy outline. The possible target sections, or parts thereof, are indicated by cross-hatching. The partial cross-hatching of the starting section illustrates part (b) of Situation 1. The arrow in FIG. 5A indicate possible paths between the two segments. Some definitions and conventions are introduced at this point.

The term "forward" refers to the direction in which the data is written. Arrows 6A through 6D in FIG. 1 represent the forward direction. In even-numbered tracks, "forward" runs from left-to-right in the Figures, that is, from the physical beginning of the tape to the physical end of the tape. Accordingly, the two crosshatched segments in FIG. 5A are "forward" of segment S5, shown in heavy outline in track 2.

Conversely, in odd-numbered tracks, "forward" runs right-to-left, that is, from the physical end to the physical beginning. Accordingly, if segment S1 were the starting segment, in track 1, then segments S2 and S3 would be "forward" of it.

"Reverse" is the opposite of forward.

In addition, "forward" and "reverse" are defined within the track in which the target section lies. That is, for example, section S1 is "reverse" of section S4. But section S1 is not defined as having a "forward" or "reverse" direction with respect to section S5, which lies in another track. To make the comparison, section S1 is compared with a section in a corresponding position to section S5, which would be section S4, in this example. "Corresponding" means the same numbered position. Thus, considering section S4, section S1 would be reverse of section S4.

In some contexts, "starting section" and "target section" refer to the sections holding the starting segment and target segment, respectively.

Situation 2. The target is forward, compared to (a) the starting section, or (b) a corresponding section. If the target is in the same track, then it must be more than two sections away. If the target is in a co-directional track, then it must be more than one section away. Three definitions are introduced here.

"Direction" (as in "co-directional") refers to relative direction of the tape head, with respect to the tape. In even-numbered tracks (zero is considered an even number), the relative movement occurs as though the tape were stationary and the head moves left-to-right in FIG. 5B. Even-numbered tracks are considered mutually "co-directional," because the relative movement for them is the same.

In odd-numbered tracks, the relative movement of the head is right-to-left. Thus, odd-numbered tracks are also considered mutually co-directional. But even-numbered tracks are "anti-directional" with respect to odd-numbered tracks, because the relative movement for even-numbered tracks is opposite that for odd-numbered tracks.

With these definitions, Situation 2 is illustrated in FIGS. 5B and 5BB, wherein the hatched sections represent target sections, and the sections in heavy outline are the starting sections. FIG. 5B shows the starting section located in an even-numbered track. FIG. 5BB shows the starting section located in an odd-numbered track.

Situation 3. If the target is in same track, then it must lie any place in reverse of the originating segment, but not in the first two sections of the track. "Any place in reverse" can lie within the starting section.

The term "first two sections" is defined as the first two sections in a track encountered when running in the forward direction. Thus, for an even-numbered track in FIG. 1, the first two sections are numbered 0 and 1. For an odd-numbered track, the first two sections are numbered 12 and 13.

Returning to situation 3, if the target is in a co-directional track (as opposed to the same track, as discussed first), then it is either (a) in the same section number as the starting section, (b) one section forward of the starting section, or (c) any place in reverse of the starting section, but not in the first two sections. As above, "any place in reverse" can lie within the starting section.

Figure 5C:
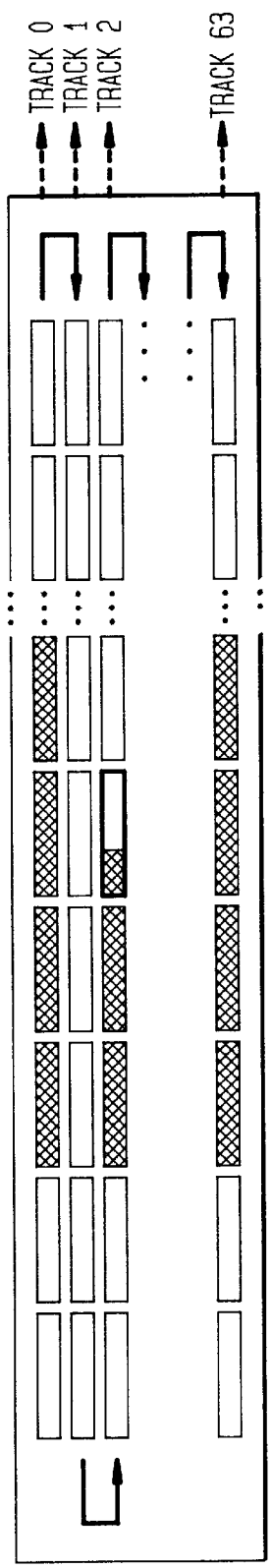
FIGS. 5A, 5B, 5BB, 5C, 5CC, 5D, 5DD, 5E, 5EE, 5F, 5FF, 5G, and 5GG indicate several types of movements executed in moving a read\write head from a starting segment to a target segment in a serpentine data tape.
Figure 5C:
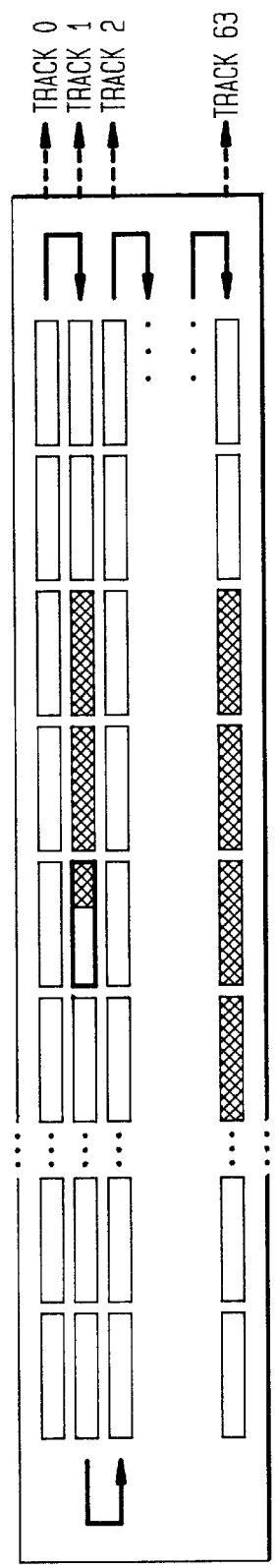

Situation 3 is illustrated in FIGS. 5C and 5CC. The former shows the starting segment located in an even-numbered track. The latter shows the starting segment located in an odd-numbered track.

Figure 5D:
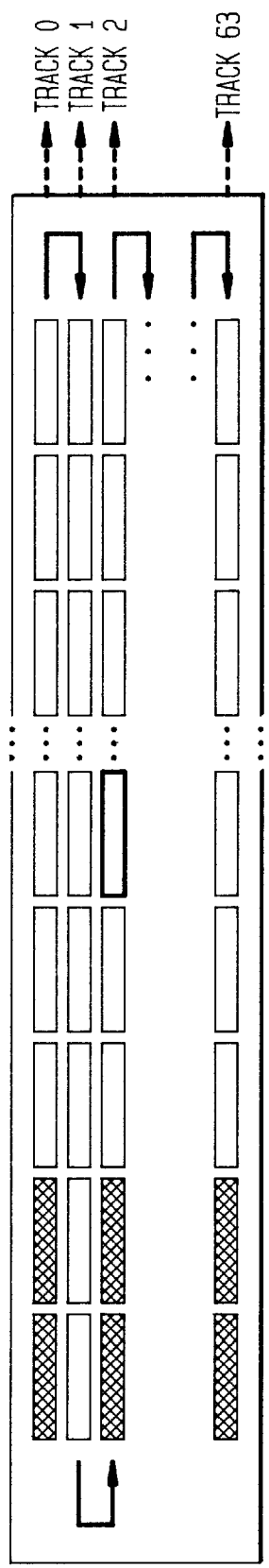
Figure 5D:
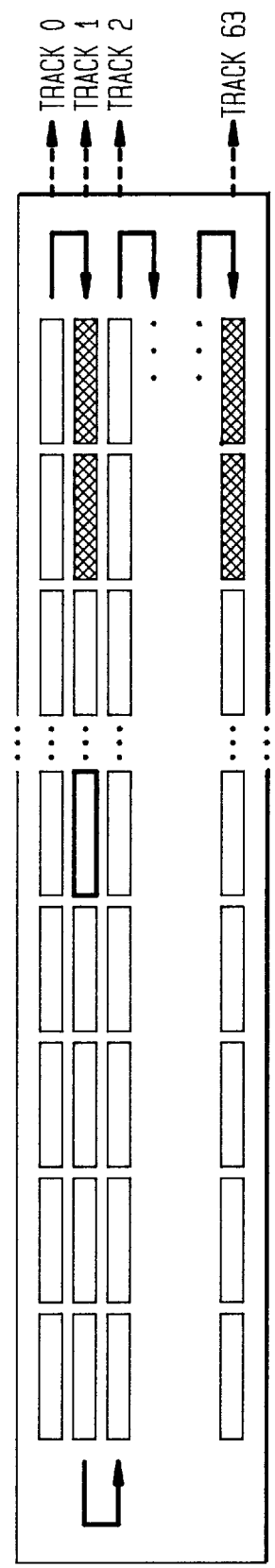

Situation 4. The target is in reverse of the starting section, and in the first two sections, in the same or a co-directional track. Situation 4 is illustrated in FIGS. 5D and 5DD. The former shows the starting section located in an even-numbered track. The latter shows the starting section located in an odd-numbered track.

Figure 5E:
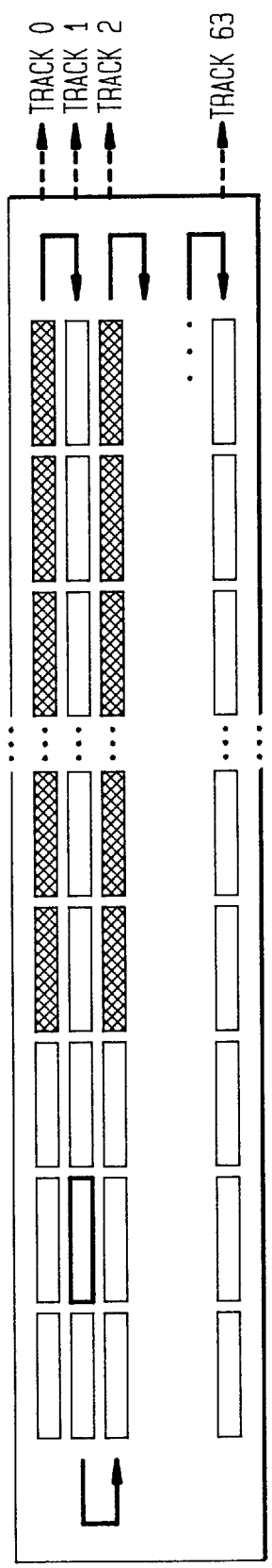
Figure 5E:
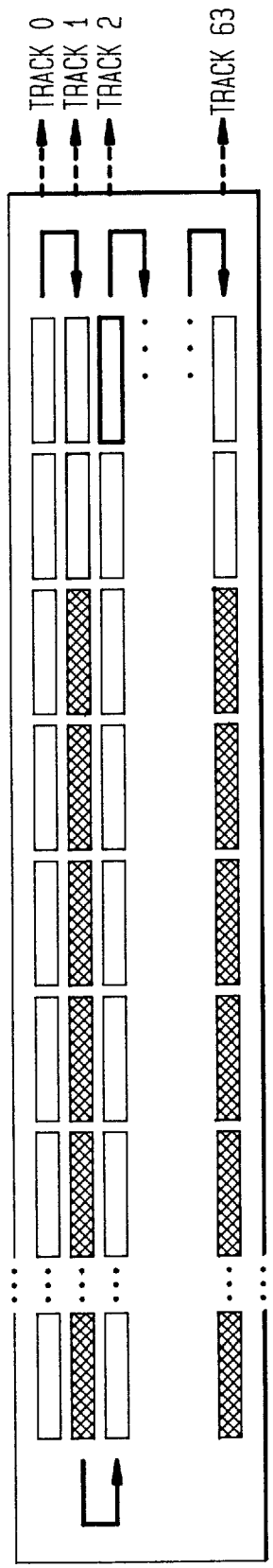

Situation 5. The target is forward of the starting section, and two or more sections away, in an anti-directional track. Situation 5 is illustrated in FIGS. 5E and 5EE. The former shows the starting section located in an odd-numbered track. The latter shows the starting section located in an even-numbered track.

Situation 6. The target lies in an anti-directional track, and target is either (a) in the same section number as the starting segment, (b) one section forward of the starting segment, or (c) reverse of the starting segment, but, in case (c), not in the first two sections.

Situation 6 is illustrated in FIGS. 5F and 5FF. The former shows the starting section located in an odd-numbered track. The latter shows the starting section located in an even-numbered track. The reader is reminded that "forward" is measured with reference to a section corresponding to the starting section, such as corresponding section S10 in FIG. 5F.

Figure 5G:
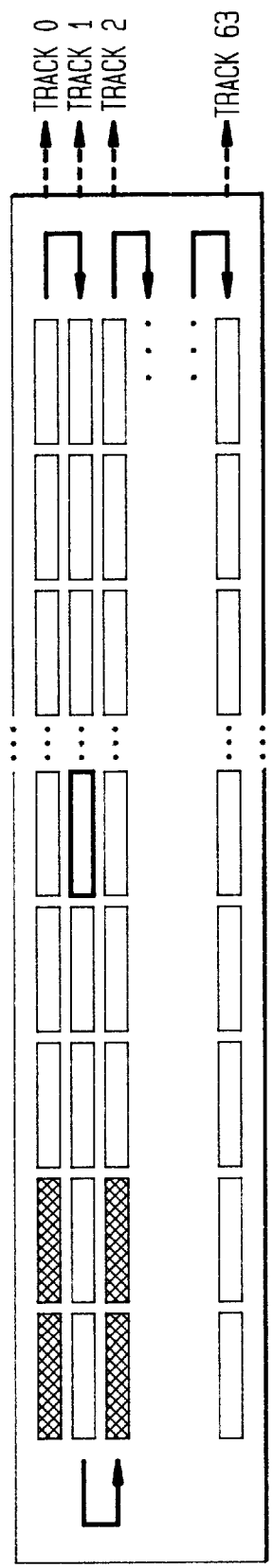
Figure 5G:
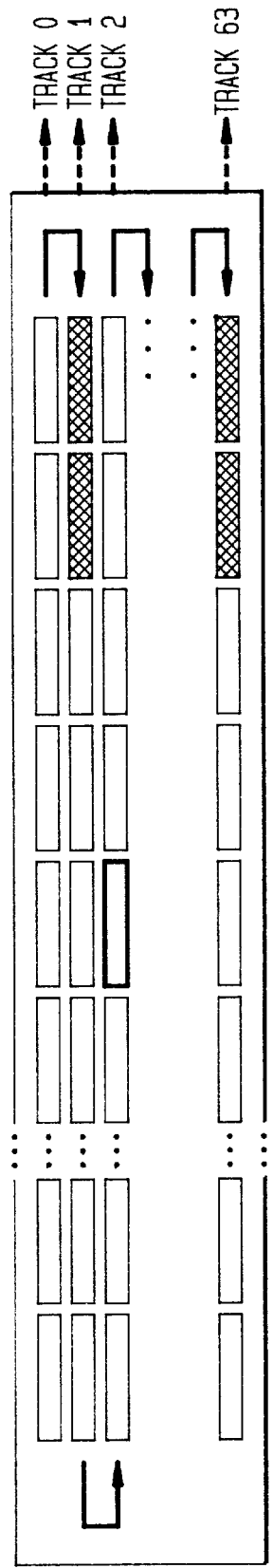

Situation 7. The target is in reverse of the starting section, and in the first two sections, in anti-directional track. Situation 7 is illustrated in FIGS. 5G and 5GG. The former shows the starting section located in an odd-numbered track. The latter shows the starting section located in an even-numbered track.

The characteristics of these sub-models can be arranged in tabular form as follows:

TABLE 2

| Direction from Starting Segment to Target | Distance | Track Relation Between Starting Segment and Target |
|---|---|---|
| FIG. 5A | | |
| Forward | Two sections or fewer | Same Track |
| FIG. 5B: Two Cases: | | |
| Forward | More than two sections | Same |
| Forward | More than one section | Co-directional |
| FIG. 5C: Two cases: | | |
| Reverse | Any number of sections, but not to first two | Same or co-directional |
| Forward | zero or one section | Co-directional |
| FIG. 5D: | | |
| Reverse | To first two sections | Same or co-directional |
| FIG. 5E: | | |
| Forward | Two or more sections | Anti-directional |
| FIG. 5F: Two Cases: | | |
| Forward | No more than one section | Any |
| Reverse | Any number of sections, except to first two | Any |
| FIG. 5G: | | |
| Reverse | To first two sections | Anti-directional |

The model is used to predict transit time, for any selected pair of segments. The type of movement, between sections, is first classified, as lying at the physical end of the tape or, if not, then according to FIGS. 5A through 5G. Then, the corresponding sub-model is selected, and the transit time computed.

Therefore, the model provides a means to compute transit time between any selected pair of segments. (In general, the transit times are not symmetrical within pairs: time from segment A to segment B is not the same as from B to A.)

Scheduling

First, a list of segments to be accessed is obtained. Then, based on criteria to be discussed later, one of the following algorithms is invoked, to obtain a sequence in which to access the segments on the list.

1. READ algorithm: Read the tape, from beginning to end. During the reading, continually check whether a segment currently being read resides on the list. If so, fetch the segment. It is pointed out that the segments contained on the list will, in general, be arranged in an arbitrary order, which will not produce a minimal total access time.

2. FIFO (First In, First Out) algorithm: Fetch the segments in the same order in which they are presented in the list.

Figure 6:
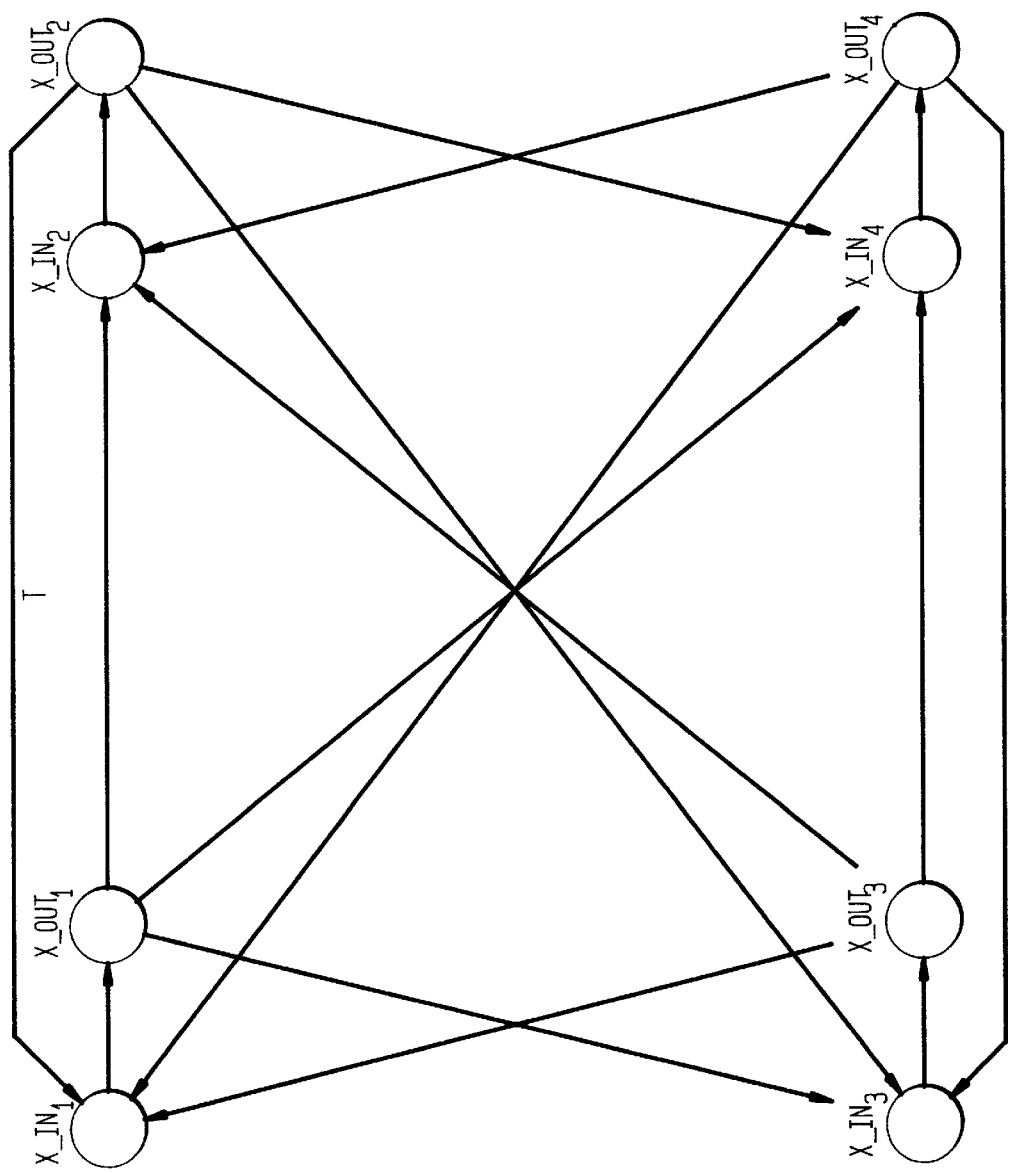
FIG. 6 is a directed graph, illustrating one algorithm for scheduling read-requests in a serpentine data tape.

3. OPT (Optimal) algorithm: Schedule the accesses in a sequence, based on a graph-theory solution to the asymmetric traveling salesman problem, who begins traveling in an arbitrary city. FIG. 6 illustrates a simplified example.

The Figure illustrates a directed graph, containing four pairs of sections, labeled "X". X_in is adjacent to X_out, and represents the segment which is physically adjacent to X_out, if X_in is a single segment to be read. If a string of adjacent segments is to be read, then X_in represents the first segment, and X_out is adjacent the last segment.

The "X's" correspond to cities in the travelling salesman problem, and the arrows indicate paths taken between cities. A time "T" is assocated with each arrow, as indicated at the top of the Figure. A single "T" is shown, to avoid clutter. In general, the travel times "T" will be different.

The OPT algorithm is known in the art. In this algorithm, all possible routes of travel are examined, and the route having the shortest total time is selected.

4. SORT algorithm: order the segments in ascending sequence according to segment (not section) number.

5. SLTF (Shortest Locate Time First) algorithm: Start with current head location, such as the beginning of track 0. Examine the list, and select the section which can be reached in the shortest time from the current location. Next, eliminate that section from the list, and treat the head as now located at that section. Then, select the section which can be reached in the shortest time from that new location, and so on.

Figure 6A:
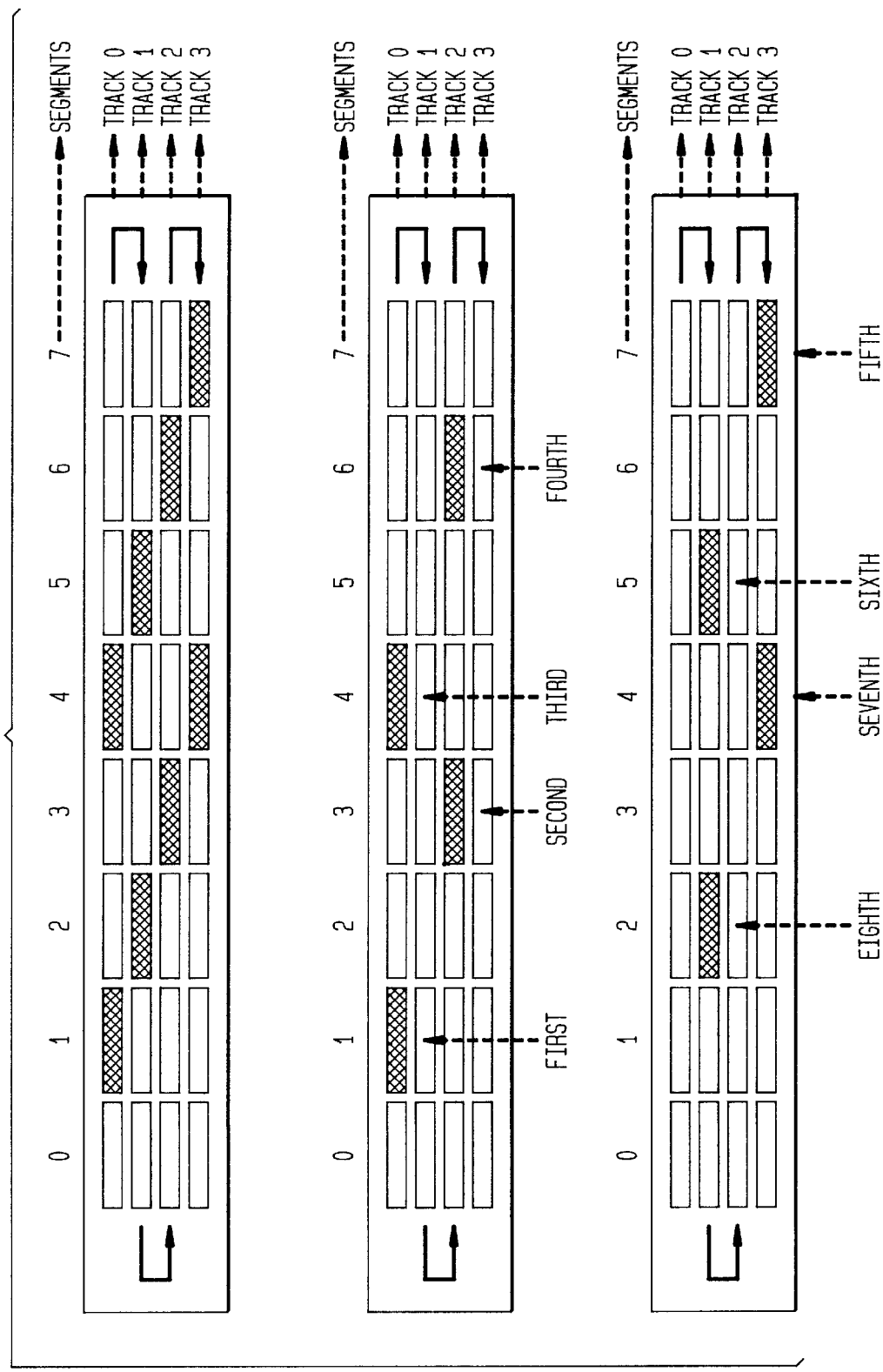
FIG. 6A provides an example of the "Weave" algorithm described herein.

6. SCAN algorithm: FIG. 6A illustrates this algorithm, with reference to a four-track tape, containing eight segments per track. Assume that the eight segments shown in hatching at the top of the Figure are to be addressed. The algorithm runs the head from left-to-right, and reads the segments in the even-numbered tracks, in the order encountered, as indicated by the symbols FIRST, SECOND, etc., in the central part of the Figure.

Then, when the head is at its rightmost position, the algorithm runs the head right-to-left, and reads the segments in the odd-numbered tracks, again, in the order encountered, as indicated by the symbols FIFTH, SIXTH, etc., in the lower part of the Figure.

The algorithm can be explained by the following pseudo-code, wherein the phrase request(T, X) indicates a list of requests in track T, section X, sorted in ascending order according to segment number.:

```
partial_schedule = empty
while (some requested segment has not yet been scheduled) {
    for X = 0 to 13 {
        if (there exists forward track T such that
        request (T,X) is not empty) {
            append request (T,X) onto
            partial_schedule, and
            set request(T,X) to empty.
        }
    }
    for X = 0 to 13 {
        if (there exists reverse track T such that
        request(T,X) is not empty) {
            append request(T,X) onto
            partial_schedule, and
            set request(T,X) to empty.
        }
    }
}
```

7. WEAVE algorithm: This algorithm is based on the observation that all movements from a starting segment to a target segment, illustrated in FIGS. 5A through 5GG, do not all require the same amounts of time. The algorithm is given in the appendix, entitled "Weave Algorithm."

Six of the Situations, discussed above, are identified in the comment-lines of the algorithm, which begin with "/*" and end with "*/". The comments are labeled with numerals 1 through 6 and, in increasing order of time required, refer to the target segment as being in the:

1. Same track, forward 1 section (given in short-hand notation in the comment "/* 1:T, Sf1 */")
2. Same track, forward 2 sections.
3. Co-directional track, forward 2 sections.
4. Anti-directional track, reverse 1 section.
5. Codirectional track, forward 1 section.
6. Anti-directional track, reverse 2 sections.

In addition to these movements, over one hundred other movements are determined by the "LOOP" section of the algorithm.

The algorithm is given the current head position, and a list of read requests. The algorithm searches the list, in pursuit of a request which can be fulfilled by a movement requiring the shortest time. When the request is found, it is then removed from the list, and the head assigned the position it would occupy after executing the request.

Then the process is repeated: in each step, the reduced list (from which a read request has just been deleted) is examined, assuming a new head position. A read request is sought which can be accomplished by a movement requiring the shortest time. When the read request is found, it is deleted from the list, the head moved to the new position, and so on.

Figure 7:
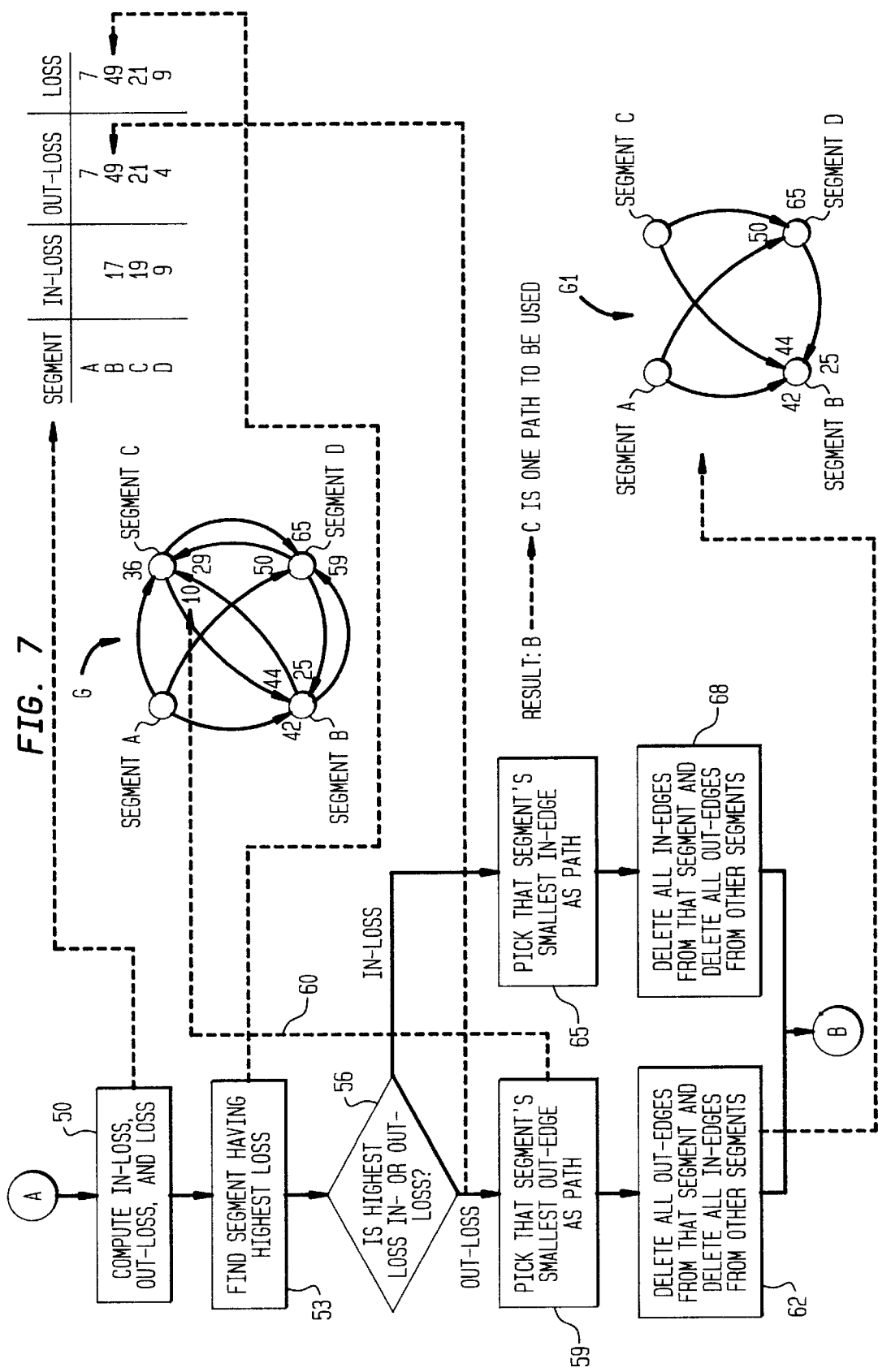
FIGS. 7 and 8 illustrate steps undertaken in the "Loss" algorithm, described herein.
Figure 8:
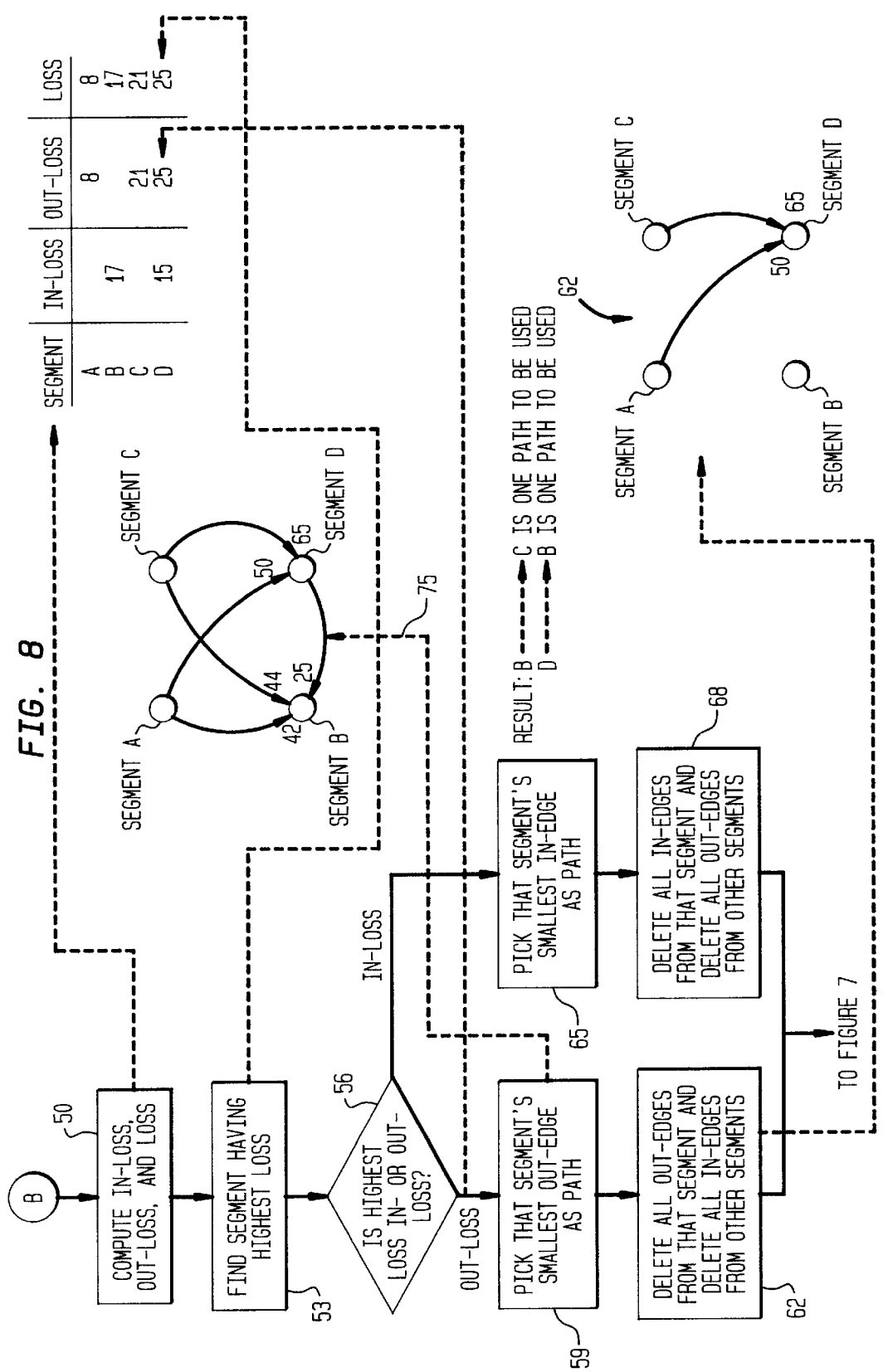

8. LOSS algorithm: FIGS. 7 and 8 illustrate a simplified example of this process. A graph G contains four segments. The arrows represent transit times between the segments, and each points from a starting segment toward a target segment. Segment A represents the starting point, and corresponds to the current location of the read/write head. Since the read/write head can only leave segment A, that segment carries only outgoing arrows.

In block 50, three quantities are computed:
(1) In-loss, which is the difference between the two smallest incoming transit times to a segment.
(2) Out-loss, which is the difference between the two smallest outgoing transit times from a segment.
(3) Loss, which is computed for a segment, and is the larger of the segment's in-loss or out-loss.

In block 53, the highest loss, for all segments, is found. In this iteration, the highest loss is valued at 49, and belongs to segment B.

Then, decision block 56 ascertains whether the highest loss corresponds to an in-loss or an out-loss. In this iteration, an out-loss is responsible. Since an out-loss is responsible, the smallest outgoing path from segment B (previously identified in block 53) is identified in block 59, as indicated by the arrow 60. This path will be used in the scheduling, as indicated by the RESULTs section, in the lower right part of the Figure.

Now, the graph is reduced, by eliminating all outgoing paths from segment B, and all incoming paths into segment C. The rationale is that segment B will not be exited again, and segment C will not be entered again. The resulting, reduced graph G1 is indicated in the lower right part of the Figure.

The next iteration begins at point B in FIG. 8. Again, in-loss, out-loss, and loss are computed. Segment D produces the highest loss, which is an out-loss. The smallest outgoing path from segment D is selected, as indicated by arrow 75. This path will become part of the schedule.

The graph is then further reduced, as in block 62, and the reduced graph G2 is shown at the lowed right side of the Figure. The "Results" section indicates the results after two iterations: path B-to-C and D-to-B. The process repeats, until all segments have been covered.

The paths selected are then arranged into a meaningful sequence. For example, D-to-B will be sequenced adjacent, and prior, to B-to-C.

This "Loss" approach is a solution to the asymmetric travelling salesman problem. This solution is known in the art of graph theory. "Asymmetric" means that the time to travel from city A to city B is not necessarily the same as for the reverse trip, from city B to city A.

Therefore, several scheduling approaches have been described, for scheduling the order of accessing the segments on the tape. The relative merits of each were measured, using a computer simulation.

Results

A computer simulation was undertaken, wherein two sets of random numbers were generated. In one set, each number indicated a number of accesses (ie, number of segments to be read) on the tape. For example, if the set contained the numbers (100, 4, 1200, and 6), the numbers indicate four lists of segments, and the lists contain 100, 4, 1200, and 6 segments each. In this set, the random variable (ie, the number of accesses in each list) ranged from zero to 2048.

In the other set, the random variable ranged from 0 to 622,058, and identified segment numbers. (The earlier approximation of 625,000 segments per tape has been now changed to 622,058.) Each set corresponds to one of the elements in the other set. For example, considering the element "4" in the first set, indicating a list which contains four segments, the second set is then required to provide four random numbers, which identify the four segments.

Figure 9:
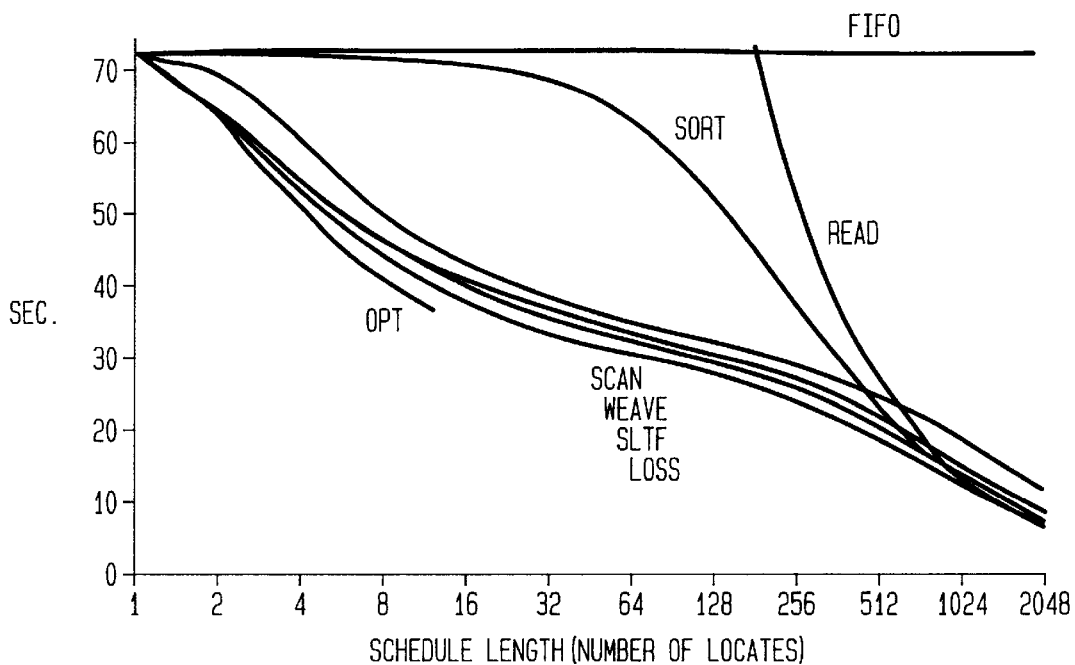
FIGS. 9 and 10 illustrate results of simulations of the invention.
Figure 10:
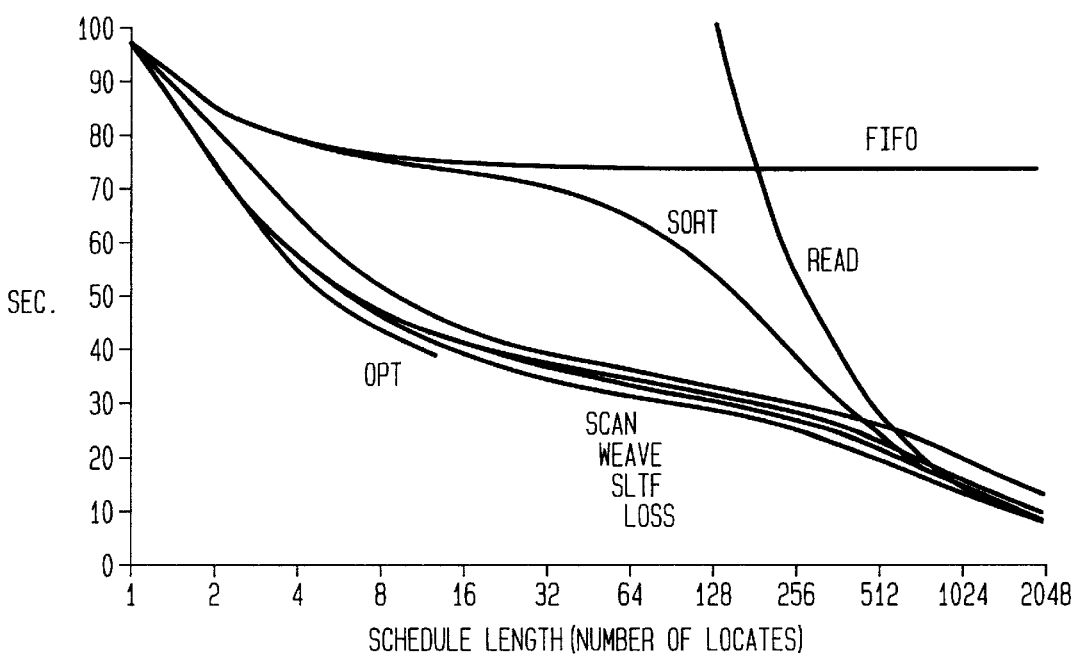

FIG. 9 illustrates results of the simulation, and shows the average time per access, for the different sequences, when the process began at a random starting segment. FIG. 10 illustrates similar data, but with a different starting point, namely, when the overall process began at the beginning of the tape. FIGS. 11A–11D provides selected data in tabular format.

Several characteristics of these plots are significant. One is that for "long" lists of segments to be accessed, such as for lists exceeding 1024 segments in FIGS. 9 and 10, the READ algorithm is nearly as fast as the LOSS algorithm. Specifically, as indicated in FIGS. 11A–11D, in the "Num. Locates" rows labeled 1536, the READ algorithm becomes fastest at this number of accesses.

A second characteristic is that, for lists of accesses ranging from about 16 to just under 1024, the SCAN, WEAVE, SLTF, and LOSS algorithms have similar performance, with the LOSS algorithm providing shortest total access time.

A third characteristic is that the OPT algorithm is always fastest (see FIGS. 11A–11D), but that, when the list of accesses exceeds about 12 in number, computing the order of read operations, using the algorithm, requires an impractical amount of time.

A fourth characteristic is that the FIFO algorithm is never preferred, except for a list containing a single element.

A fifth characteristic is that the SORT and READ algorithms are not preferred, until the list reaches about 1536 segments.

Therefore, in one form of the invention, different scheduling algorithms will be used, depending on the number of segments contained within the list to be accessed.

Additional Embodiment

In general, it is expected that a list of segments to be read from a tape will contain multiple segments which are contained within common sections, yet these segments will not lie adjacent to each other within the list. Consequently, if the segments are read in the order listed, a particular first section on the tape will be visited, then another section will be visited, and then, later, the first section will again be visited, when a later segment is encountered in the list, which is located in that first section. The first section was visited twice.

In one form of the invention, the list of segments is first examined, in a pre-processing step, and all segments are grouped together by section. Then, later, during reading, when each section is visited by the read/write head, all segments located in that section are read, and then the read/write head departs the section, and does not return.

In this form of the invention, the list of sections to be visited is given to the algorithms for scheduling, rather than a list of the individual segments.

Additional Considerations

1. In characterizing the tape, to produce the plot of FIG. 2, data was written to the tape. This data can be that which is to be stored on the tape. After writing the data, the tape is characterized, as described above. Alternately, this data can be dummy data, used for the sole purpose of characterizing the tape.

2. The data representing the table of FIG. 2 requires about 3,600 bytes. That is, as FIG. 1 indicates, the tape contains 64 tracks, of 14 sections each, totaling 896 sections. As discussed above, the tape contains about 625,000 segments. Each of the 896 sections must be given an address, in terms of segment number, which ranges from zero to about 625,000. A four-byte number is used as the address. 896 sections×4 bytes/section=3,584 bytes total.

3. The models discussed above provide a very accurate estimation of transit times. As one example, in a test, 1,000 random read-operations were generated. The predicted transit times for 977 of these were found to be within 2 seconds of the actual, measured transit times. Restated, 97.7 percent of the predicted transit times were within 2 seconds of the actual transit times. This data supports the proposition that at least 90 percent, and at least 95 percent, of the predicted transit times were within 2 seconds of the actual transit times.

Figure 12:
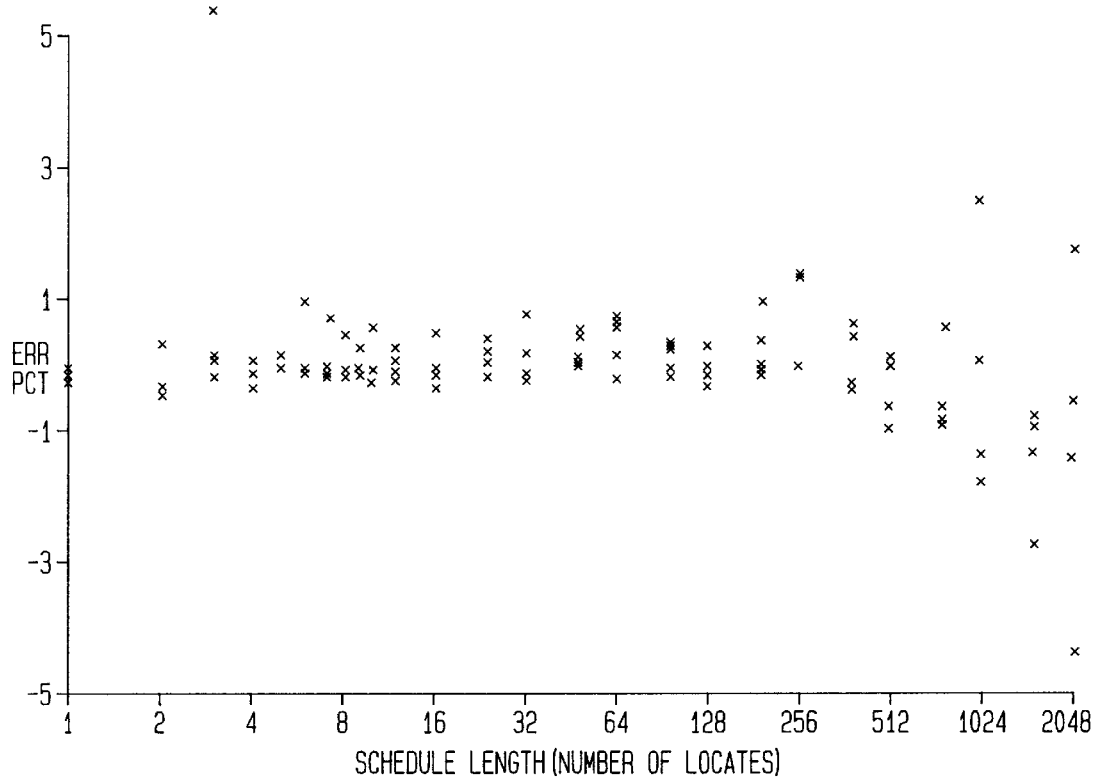
FIG. 12 illustrates behavior of the invention.

4. Another measure of accuracy is given in FIG. 12. That Figure illustrates test results for 26 different sizes of lists of data requests (one request through 2048 requests). Each size of list (such as a 32-request list) was simulated four times, as indicated by the four "x's" in the 32-request column, with a different content of read requests in each simulation.

The predicted total time for each list was compared with the actual total time to execute each list. The percentage error, plotted on the vertical axis, was computed as follows:

$$\text{Error Percentage} = 100 \times (\text{predicted time} - \text{measured time})/(\text{measured time})$$

A negative error percentage indicated that the predicted time was too low. A positive error percentage indicated that the predicted time was too high.

The Figure indicates that for lists containing 512 read requests or fewer, the predicted total read time was within two percent of the actual read time, with the exception of one outlier at the three-element list. This supports the proposition that the invention provides a predicted total read time which is within two percent of actual read time for at least ninety percent of the lists.

5. The plot of FIG. 2 can be characterized as including transit times for successive segments. The transit times progressively increase, for successive segments, with the exception of the dips, shown in FIG. 3. At a dip, transit time for a segment is smaller than the transit time for both (a) the immediately preceding segment and (b) the immediately succeding segment.

Figure 13:
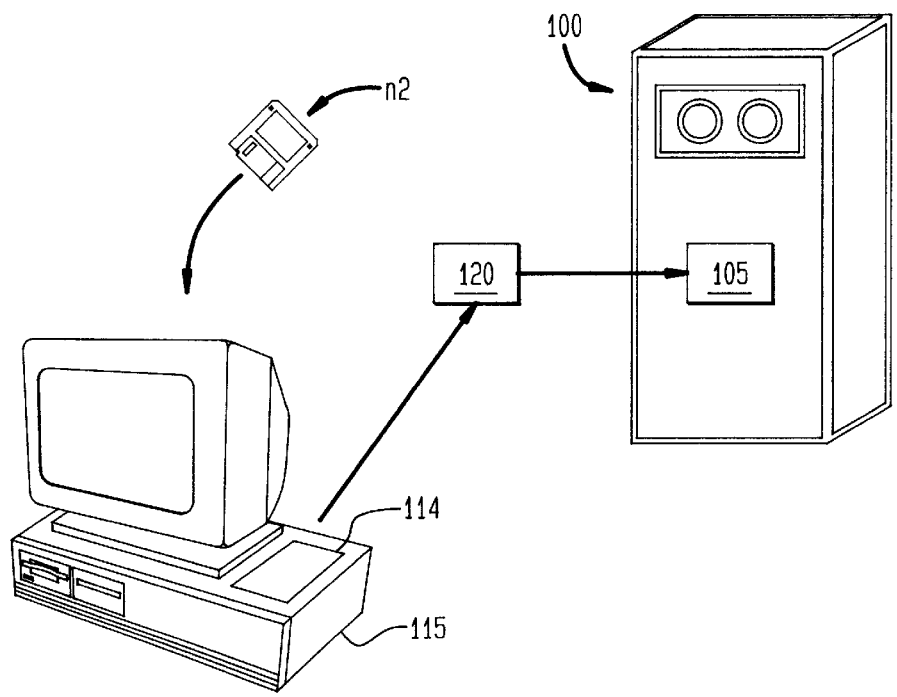
FIG. 13 illustrates one form of the invention.

6. FIG. 13 illustrates one form of the invention. A serpentine tape drive system 100 contains a controller 105. A list 110 of read requests, contained on a floppy diskette 112, or other input device, is processed by a scheduling means 114, in the form of algorithms, such as those listed above, which run on computer 115. The scheduling means produces schedules 120, which organize the read requests in a preferred order, which are given to the controller 105 to execute.

Numerous substitutions and modifications can be undertaken without departing from the true spirit and scope of the invention. What is desired to be secured by Letters Patent is the invention as defined in the following claims.

APPENDIX

WEAVE Algorithm

```
#define INVERT_END(trk) {                                                    \
    if((trk) & 1) {/* will be looking on odd trk: 12<->13*/                  \
        if(sect_x < 12 && (next_sect == 12 || next_sect == 13))              \
            next_sect = 25 - next_sect;                                      \
    }                                                                        \
    else {/* will be looking on even trk: 0<->1 */                           \
        if (sect_x > I && (next_sect == 0 || next_sect == 1))                \
            next_sect = 1 - next_sect;                                       \
    }                                                                        \
}                                                                            \
#define FORWARD_SECT(trk_x, sect_x, n)\
    (((trk_x) & 1) ? (sect_x) - (n) : (sect_x) + (n))
#define REVERSE_SECT(trk_x, sect_x, n) FORWARD_SECT(trk_x, sect_x, (-(n)))
#define OK_SECT(sect) ((sect) >= 0 && (sect) <= 13)
#define MAYBE_FOUND                                                          \
    if (next_trk >= 0 && next_trk <= 63 && OK_SECT(next_sect) &&             \
        head[next_trk][next_sect] != -1) {                                   \
            *trk = next_trk;                                                 \
            *sect = next-sect;                                               \
            return;                                                          \
    }
#define PARALLEL_TRK ((trk_x & 1) ? 1 : 0)
#define NONPARALLEL_TRK ((trk_x & 1) ? 0 : 1)
static void
weave_find_data(const int head[MAX_TRK][MAX_PT_PER_TRK], int *trk, int *sect)
{
    int     trk_x = *trk;
    int     sect_x = *sect;
    int     next_trk;
    int     next_sect;
    int     delta;
    /* weaving order on sections: */
    /* current section is S in trk T */
    /* here f means forward and r means reverse wrt direction of T */
    /* here "invert_end" means if 13 do 12, similarly 12->13, 0->1, 1- 0*/
    /*1: T, Sf1 */
    next_trk = trk_x;
    next_sect = FORWARD_SECT(trk_x, sect_x, 1);
    MAYBE_FOUND;
    /*2: T, Sf2 */
    /*next_trk = trk_x;*/
    next_sect = FORWARD_SECT(trk_x, sect_x, 2);
    MAYBE_FOUND;
    /*3: || trk, Sf2 */
    /*next_sect = FORWARD_SECT(trk_x, sect_x, 2);*/
    if (OK_SECT(next_sect))
        for (next_trk = PARALLEL_TRK; next_trk < 64; next trk += 2)
            MAYBE_FOUND;
    /* 4: ~|| trk, Sr1 */
    next_sect = REVERSE_SECT(trk_x, sect_x, 1);
    if (OK_SECT(next_sect))
        for (next_trk = NONPARALLEL_TRK; next_trk < 64; next_trk += 2)
            MAYBE_FOUND;
    /* 5: || trk Sf1*/
    next_sect = FORWARD_SECT(trk_x, sect_x, 1);
    if (OK_SECT(next_sect))
        for (next_trk = PARALLEL_TRK; next_trk < 64; next trk += 2)
    MAYBE_FOUND;
    /* 6: ~|| trk, Sr2 */
    next_sect = REVERSE_SECT(trk_x, sect_x, 2);
    if (OK_SECT(next_sect))
        for (next_trk = NONPARALLEL_TRK; next_trk < 64; next_trk += 2)
            MAYBE_FOUND;
    /* loop i==0,1,2 . . . */
    for (delta = 0; delta < 14; delta++) {
        /* ~|| trk, invert_end(Sfi) */
        next_sect = FORWARD_SECt(trk_x, sect_x, delta);
        INVERT_END(trk_x+1),
        if (OK_SECT(next_sect))
            for (next_trk = NONPARALLEL_TRK; next_trk < 64; next_trk += 2)
                MAYBE_FOUND;
        /* same trk, Sf(i+3) */
        next_trk = trk_x;
        next_sect FORWARD_SECT(trk_x, sect_x, delta+3);
            MAYBE_FOUND;
        /* || trk, Sf(i+3) */
        /*next_sect = FORWARD_SECT(trk_x, sect_x, delta+3);*/
```

APPENDIX-continued

WEAVE Algorithm

```
            if (OK_SECT(next_sect))
                for (next_trk = PARALLEL_TRK; next_trk < 64; next_trk += 2)
                    MAYBE_FOUND;
            /* same trk, invert_end(Sri) */
            next_trk = trk_x;
            next_sect REVERSE_SECT(trk_x, sect_x, delta);
            INVERT_END(trk_x);
            MAYBE_FOUND;
            /* || trk, invert_end(Sri)*/
            /*next_sect = REVERSE_SECT(trk_x, sect_x, delta);
            *INVERT_END(trk_x);
            /*
            if (OK_SECT(next_sect))
                for (next_trk = PARALLEL_TRK; next_trk < 64; next_trk += 2)
                    MAYBE_FOUND;
            /* ~|| trk, Sr(i+3) */
            next_sect = REVERSE_SECT(trk_x, sect_x, delta+3);
            if (OK_SECT(next_sect))
                for (next_trk = NONPARALLEL_TRK; next_trk < 64; next_trk += 2)
                    MAYBE_FOUND;
            /* all done if(Teven: Sri < 0 and Sfi > 13)
            *          (Todd: Sfi < 0 and Sri > 13)
            */
        }
        printf("bug: weave_find_data failed to find any data\n");
        exit(1);
}
```

We claim:

1. A method of handling a list of read-requests for a tape drive, comprising the following steps:

a) when the number of read-requests lies below a threshold, scheduling the order of read operations using a first algorithm, and b) when the number of read-requests falls above the threshold, scheduling the order of read operations using a second algorithm.

2. Method according to claim 1, in which the tape drive is of the serpentine type.

3. In the operation of a serpentine data storage tape, the improvement comprising the following steps:

a) obtaining a list of data blocks to read from the tape; and b) using data which indicates respective times for reaching each block from the beginning of the tape, scheduling the data blocks in an order which requires less time than reading the data blocks in the order listed.

4. Method according to claim 3, wherein (A) the tape comprises segments and (B) the step of scheduling comprises a process of characterizing the tape, which includes the steps of (i) writing data to the tape and (ii) using the data, developing a model of the tape which allows computation of the time required to reach every segment of the tape from any other segment.

5. Method according to claim 4, wherein the data is dummy data.

6. Method according to claim 3, wherein transit times which elapse between a read of one data block and a read of a subsequent data block are sometimes proportional to distance between the blocks, and sometimes inversely proportional to the distance.

7. In the operation of a serpentine data storage tape, the improvement comprising:

a) maintaining several algorithms for scheduling read operations from the tape; and b) when a list of data blocks is to be read, selecting an algorithm, based on the number of data blocks in the list, and executing it.

8. A data storage system, comprising:

a) a serpentine tape system; and b) means for predicting total times to execute lists containing less than 512 read requests, within two percent accuracy, for over 90 percent of the lists.

9. A method of reading data blocks, identified in a list, from a serpentine tape in which the data blocks are organized into sections, comprising the following steps:

a) identifying data blocks contained in common sections; and b) presenting a list of said common sections to an algorithm for scheduling an order in which to read the common sections.

10. In a serpentine tape drive system wherein (A) data is stored in segments and (B) executing a list of read requests in order of listing results in an average data-read time T, the improvement comprising:

a) means for re-ordering the list into an order which reduces T by at least 66 percent.

* * * * *